US009622169B2

(12) United States Patent
Kumagai

(10) Patent No.: US 9,622,169 B2
(45) Date of Patent: Apr. 11, 2017

(54) POWER-SAVE OPERATION SUPPORTING APPARATUS, POWER-SAVE OPERATION SUPPORTING METHOD, STORAGE MEDIUM AND BASE STATION

(75) Inventor: Taichi Kumagai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 418 days.

(21) Appl. No.: 13/520,510

(22) PCT Filed: Dec. 14, 2010

(86) PCT No.: PCT/JP2010/072829
§ 371 (c)(1),
(2), (4) Date: Jul. 3, 2012

(87) PCT Pub. No.: WO2011/081042
PCT Pub. Date: Jul. 7, 2011

(65) Prior Publication Data
US 2012/0289269 A1 Nov. 15, 2012

(30) Foreign Application Priority Data
Jan. 4, 2010 (JP) .................................. 2010-000148

(51) Int. Cl.
*H04W 52/02* (2009.01)
*H04W 88/08* (2009.01)
(52) U.S. Cl.
CPC ........ *H04W 52/0206* (2013.01); *H04W 88/08* (2013.01); *Y02B 60/50* (2013.01)
(58) Field of Classification Search
CPC ...... H04W 24/08; H04W 52/02; H04W 24/04
See application file for complete search history.

(56) References Cited

U.S. PATENT DOCUMENTS

2005/0227732 A1* 10/2005 Hiraki ............... H04W 36/0094
455/561
2005/0245206 A1* 11/2005 Kaikkonen ........... H04L 1/0618
455/101
(Continued)

FOREIGN PATENT DOCUMENTS

JP      H07170566      7/1995
JP      2002125258 A      4/2002
(Continued)

OTHER PUBLICATIONS

International Search Report of PCT/JP2010/072829.
(Continued)

*Primary Examiner* — Bobbak Safaipour

(57) ABSTRACT

[Technical problem] To provide a power-save operation supporting apparatus, a power-save operation supporting method, a storage medium and a base station which can reduce power consumption of a wireless access network with restraining emergence of an area whose service quality is degraded.
[Solution to problem] The power-save operation supporting apparatus includes an estimation means to estimate degree of degradation of the service quality which is caused in the case that power-save control is carried out to any base station, and a selection means to select the base station as a candidate base station, to which the power-save control should be carried out, in the case that the degree of the degradation of the service quality is not higher than a predetermined reference.

16 Claims, 19 Drawing Sheets

(56) References Cited

U.S. PATENT DOCUMENTS

| | | | |
|---|---|---|---|
| 2006/0198454 A1* | 9/2006 | Chung | H04L 25/0202 375/260 |
| 2008/0165677 A1* | 7/2008 | You | H04L 1/20 370/210 |
| 2008/0181234 A1* | 7/2008 | Arndt | G06F 9/45537 370/395.21 |
| 2008/0240009 A1* | 10/2008 | Min | H04W 52/286 370/311 |
| 2009/0061866 A1* | 3/2009 | Hwang | H04W 52/0225 455/434 |
| 2010/0118702 A1* | 5/2010 | Wu | H04W 72/1231 370/235 |
| 2011/0096688 A1* | 4/2011 | Sachs | H04W 48/18 370/252 |
| 2011/0176645 A1* | 7/2011 | You | H04L 27/2647 375/346 |
| 2011/0182271 A1* | 7/2011 | Pica | H04W 36/0083 370/332 |
| 2012/0063377 A1* | 3/2012 | Osterling | H04W 72/1252 370/311 |
| 2012/0238272 A1* | 9/2012 | Hwang | H04W 36/245 455/436 |

FOREIGN PATENT DOCUMENTS

| | | |
|---|---|---|
| JP | 200337555 A | 2/2003 |
| JP | 2006352477 A | 12/2006 |
| JP | 2007518361 A | 7/2007 |
| JP | 2008113136 A | 5/2008 |
| JP | 2009-130728 | 6/2009 |
| WO | 01/58193 A1 | 8/2001 |
| WO | 2004112414 A1 | 12/2004 |
| WO | 2007020737 A1 | 2/2007 |

OTHER PUBLICATIONS

A. Wacker, K. Sipila, A. Kuurne, "Automated and remotely optimization of antenna subsystem based on radio network performance", The 5th International Symposium on Wireless Personal Multimedia Communications (WPMC), vol. 2, pp. 752-756, Oct. 2002.

Japanese Office Action for JP Application No. 2011-547524 mailed on Mar. 24, 2015 with English Translation.

Japanese Office Action for JP Application No. 2011-547524 mailed on Nov. 17, 2015 with English Translation.

* cited by examiner

Fig.3

| 300 TRAFFIC INFORMATION | | | | |
|---|---|---|---|---|
| BASE STATION ID 301 | WIRELESS CELL ID 302 | NUMBER OF CALLS 303 | CALL INTENSITY 304 | NUMBER OF MOBILE STATIONS 305 |
| 10 | 1 | a1 | b1 | c1 |
| 10 | 2 | a2 | b2 | c2 |
| 10 | 3 | a3 | b3 | c3 |
| ... | ... | ... | ... | ... |

Fig.4

320 BASE STATION INFORMATION

| 301 BASE STATION ID | 302 WIRELESS CELL ID | 321 BASE STATION LOCATION | | | 322 WIRELESS CELL COVER AREA | 323 WIRELESS CELL COVER AREA AFTER CONTROL | 324 PARAMETER OF ANTENNA | | | 325 POWER CONSUMPTION |
|---|---|---|---|---|---|---|---|---|---|---|
| | | LONGITUDE | LATITUDE | ALTITUDE | | | INCLINATION ANGLE | AZIMUTH | HEIGHT | |
| 10 | 1 | X1 | Y1 | Z1 | s1 | s1' | θ1 | φ1 | h1 | w1 |
| 10 | 2 | X2 | Y2 | Z2 | s2 | s2' | θ2 | φ2 | h2 | w2 |
| 10 | 3 | X3 | Y3 | Z3 | s3 | s3' | θ3 | φ3 | h3 | w3 |
| ... | ... | ... | ... | ... | ... | ... | ... | ... | ... | ... |

Fig.5

310 SERVICE QUALITY INFORMATION

317 EVALUATION POINT QUALITY INFORMATION

| EVALUATION POINT | | | RECEIVED ELECTRIC FIELD INTENSITY | SIGNAL TO INTERFERENCE RATIO |
|---|---|---|---|---|
| LONGI-TUDE (311) | LATITUDE | ALTITUDE | (312) | (313) |
| X1 | Y1 | Z1 | d1 | e1 |
| X2 | Y2 | Z2 | d2 | e2 |
| X3 | Y3 | Z3 | d3 | e3 |
| ... | ... | ... | ... | ... |

318 CELL QUALITY INFORMATION

| BASE STATION ID (301) | WIRELESS CELL ID (302) | AVERAGE THROUGHPUT (314) | NUMBER OF HO TRIALS (315) | NUMBER OF SUCCESSFUL HO TRIALS (316) |
|---|---|---|---|---|
| 10 | 1 | f1 | i1 | j1 |
| 10 | 2 | f2 | i2 | j2 |
| 10 | 3 | f3 | i3 | j3 |
| ... | ... | ... | ... | ... |

Fig.8
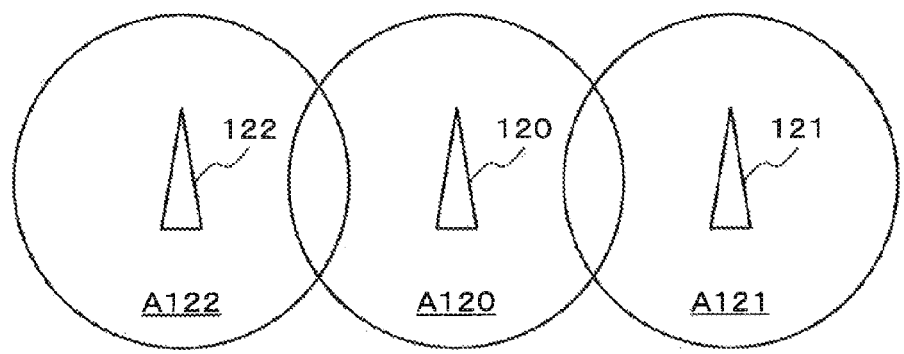
(a) INITIAL STATE
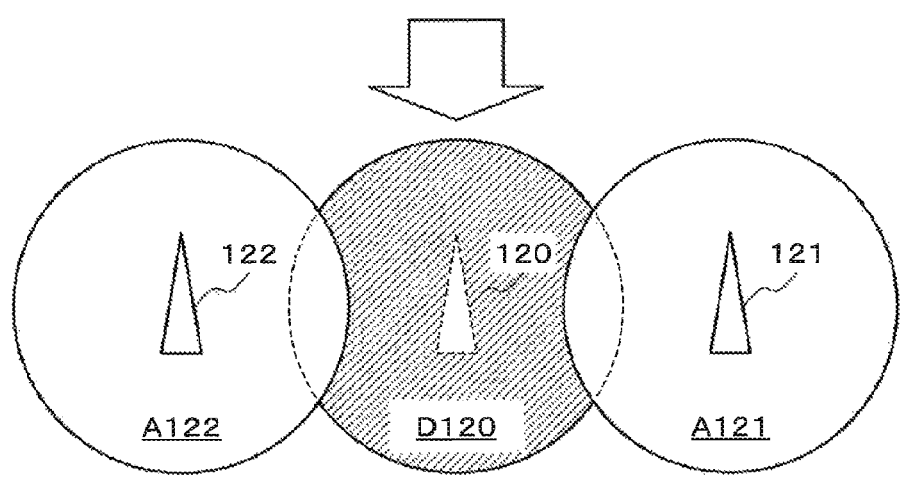
(b) STATE THAT BASE STATION IS STOPPED
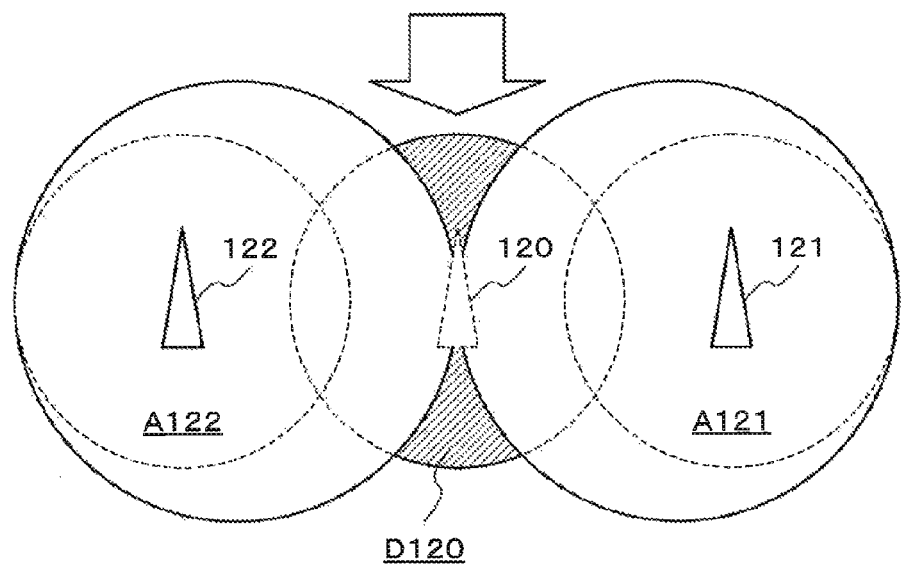
(c) CHANGING WIRELESS PARAMETER OF
SURROUNDING BASE STATION Fig.18
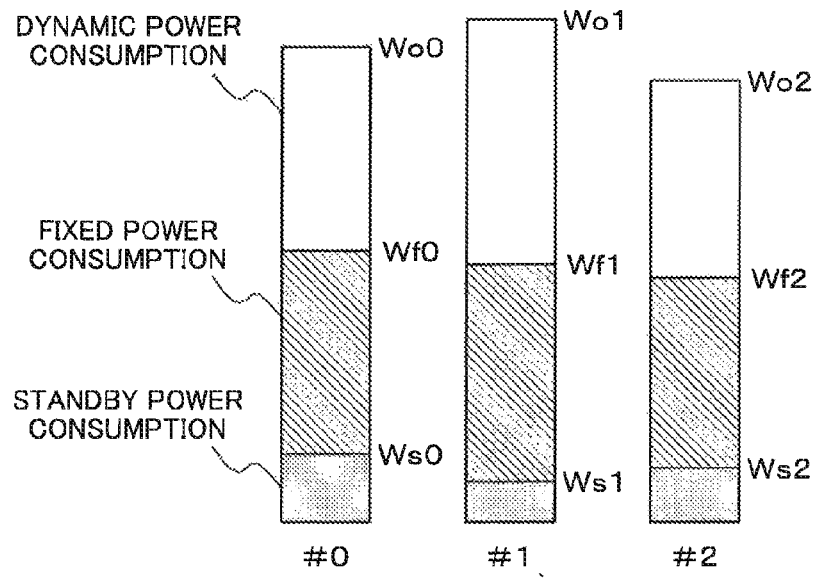
(a) INITIAL STATE
STOPPING #1
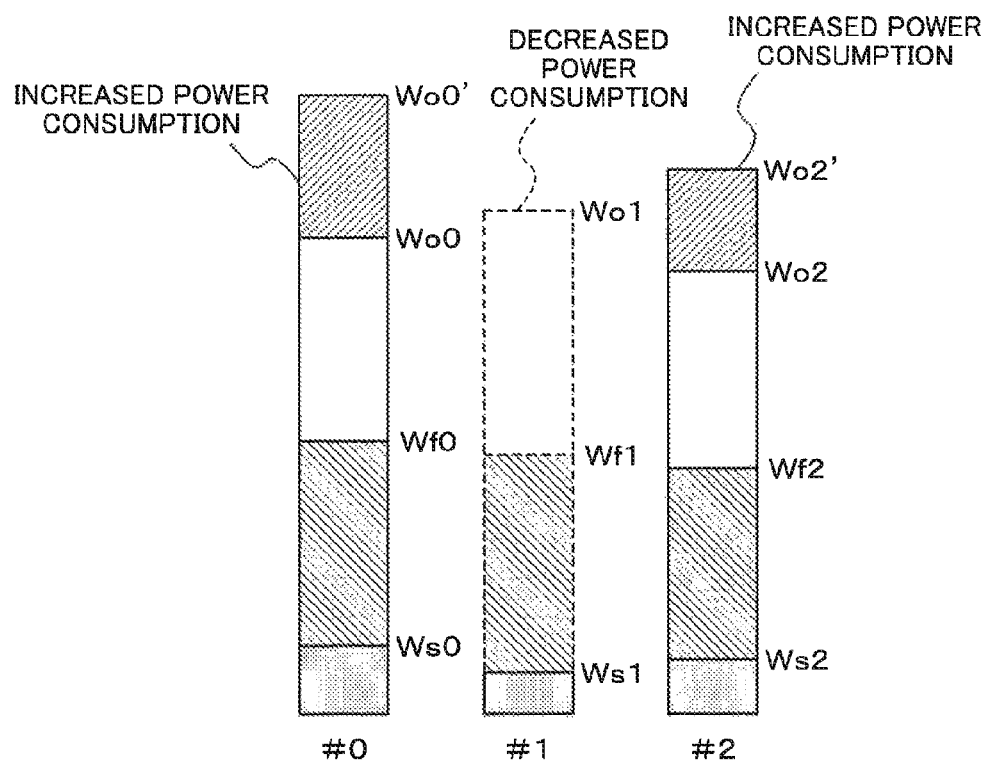
(b) STATE AFTER CARRYING OUT POWER-SAVE CONTROL

POWER-SAVE OPERATION SUPPORTING APPARATUS, POWER-SAVE OPERATION SUPPORTING METHOD, STORAGE MEDIUM AND BASE STATION

TECHNICAL FIELD

The present invention relates to a power-save operation supporting apparatus, a power-save operation supporting method, a storage medium and a base station.

BACKGROUND ART

In the case of the current radio access network, it is usual that a base station always operates, and sending output of a pilot channel or the like is kept constant. Accordingly, for example, in the case that no mobile station exists or a small number of mobile stations exist in a cover area of the base station, electric power is consumed wastefully. Meanwhile, in order to cope with the environmental problem which invades on the global scale, it is desired to construct a wireless access network which uses a small amount of electric power consumption.

As an art to realize the desire, arts described in a patent document 1 and a patent document 2 are exemplified. The patent document 1 discloses a method shown in the following. That is, one base station measures electric power of a receiving signal from a surrounding base station which surrounds the base station, and an amount of traffic of the surrounding base station. In the case that an amount of the traffic of the surrounding base station is small, and the electric power of the receiving signal satisfies required quality, the base station lowers electric power of a sending signal in response to a load of the base station and stops sending the signal finally. Moreover, the patent document 2 discloses a method to strengthen sending power of one central base station, and to make a base station, which is adjacent to the central base station, stop sending a signal and to make the adjacent base station enter into a state of receiving a signal, and consequently to make power consumption of a whole of a system decreasing, when an amount of traffic becomes decreasing.

PRIOR ART DOCUMENT

Patent Document

[Patent document 1] Japanese Patent Application Laid-Open No. 2003-37555
[Patent document 2] Japanese Patent Application Laid-Open No. 1995-170566

Non-Patent Document

[Non-patent document 1] A. Wacker, K. Sipila, A. Kuurne, "Automated and remotely optimization of antenna subsystem based on radio network performance", The 5th International Symposium on Wireless Personal Multimedia Communications (WPMC), vol. 2, pp. 752 to pp. 756, October 2002.

SUMMARY OF INVENTION

Technical Problem

Incidentally, in order to keep good service quality in the cover area of the wireless base station, it is required that quality at each evaluation point in the cover area satisfies a predetermined reference.

However, the methods disclosed in the patent document 1 and the patent document 2 do not take account of an influence of the power-save control, on the cover area. Therefore, there is a fear that an area, whose service quality becomes lower than a predetermined service quality reference level due to the power-save control, is emerged. Specifically, in the case of the patent document 1, one base station judges on the basis of the measurement information whether stopping sending the signal or not under the condition that one base station exists in the cover area of another base station. In the case that the cover area of one base station and the cover area of another base station overlap each other only partially, another base station does not take account of the area which is covered only by one base station. Accordingly, in the case of the patent document 1, there is a possibility that an area, whose service quality does not satisfy a predetermined quality, is emerged. Moreover, in the case of the patent document 2, the base station from which sending the signal should be stopped is selected on the basis of only an amount of the traffic without considering the influence, which is caused after one base station stops sending the signal, on the cover area. Therefore, in the case that a propagation environment is complicated, there is a possibility that an area, whose service quality is degraded only through the central base station carrying out the sending power control, is emerged.

The present invention is conceived to solve the above-mentioned problem. An object of the present invention is to provide a power-save operation supporting apparatus, a power-save operation supporting method, a storage medium and a base station which can reduce power consumption of the wireless access network with restraining emergence of the area whose service quality is degraded.

Solution to Problem

In order to solve the problem, a power-save operation supporting apparatus according to the present invention includes an estimation means to estimate degree of degradation of service quality which is caused in the case that power-save control is carried out to any base station, and a selecting means which, in the case that the degree of the degradation of the service quality is not higher than a predetermined reference level, selects the base station as a candidate base station to which the power-save control is carried out.

Moreover, a power-save operation supporting method according to the present invention estimates degree of degradation of service quality which is caused in the case that power-save control is carried out to any base station, and selects the base station as a candidate base station, to which the power-save control is carried out, in the case that the degree of the degradation of the service quality is lower than a predetermined reference level.

A storage medium according to the present invention stores a power-save operation supporting program which makes a computer execute the proceedings of estimating degree of degradation of service quality which is caused in the case that power-save control is carried out to any base station, and selecting the base station as a candidate base station, to which the power-save control is carried out, in the case that the degree of the degradation is not higher than a predetermined reference level.

A base station according to the present invention is at least one base station among a plurality of base stations to which power-save control can be carried out. The base station includes an estimation means to estimate degree of degradation of service quality which is caused in the case that the power-save control is carried out to the base station, and an acquisition means to acquire an estimation result on the degree of the degradation of the service quality, which is caused in the case that the power-save control is carried out to another base station, from another base station, and a selection means to select the base station as a candidate base station, to which the power-save control is carried out, out of the base station and another base station on the basis of the degree of the degradation of the service quality of the base station and another base station.

Advantageous Effects of Invention

According to the present invention, it is possible to reduce power consumption of the wireless access network with restraining emergence of the area whose service quality is degraded.

BRIEF DESCRIPTION OF DRAWINGS

FIG. 3 is a table showing an example of traffic information which a traffic information storing unit shown in FIG. 2 stores.

FIG. 4 is a table showing an example of base station information which a base station information storing unit shown in FIG. 2 stores.

FIG. 5 is a table showing an example of service quality information which a service quality information storing unit shown in FIG. 2 stores.

FIG. 8 is a conceptual diagram for explaining an example of evaluating the degree of the degradation of the service quality according to the first exemplary embodiment, and (a) in FIG. 8 shows an initial state, and (b) shows a state that the predetermined base station is stopped, and (c) shows a state that a wireless parameter of a surrounding base station is changed.

FIG. 18 is a conceptual diagram showing an example of evaluating a power-save effect according to the sixth exemplary embodiment, and (a) in FIG. 18 shows an amount of power consumption which is consumed in an initial state (a state before a base station #1 is stopped), and (b) shows an amount of power consumption which is consumed after carrying out power-save control (a state after the base station #1 is stopped).

DESCRIPTION OF EMBODIMENTS

First Exemplary Embodiment

Figure 1:
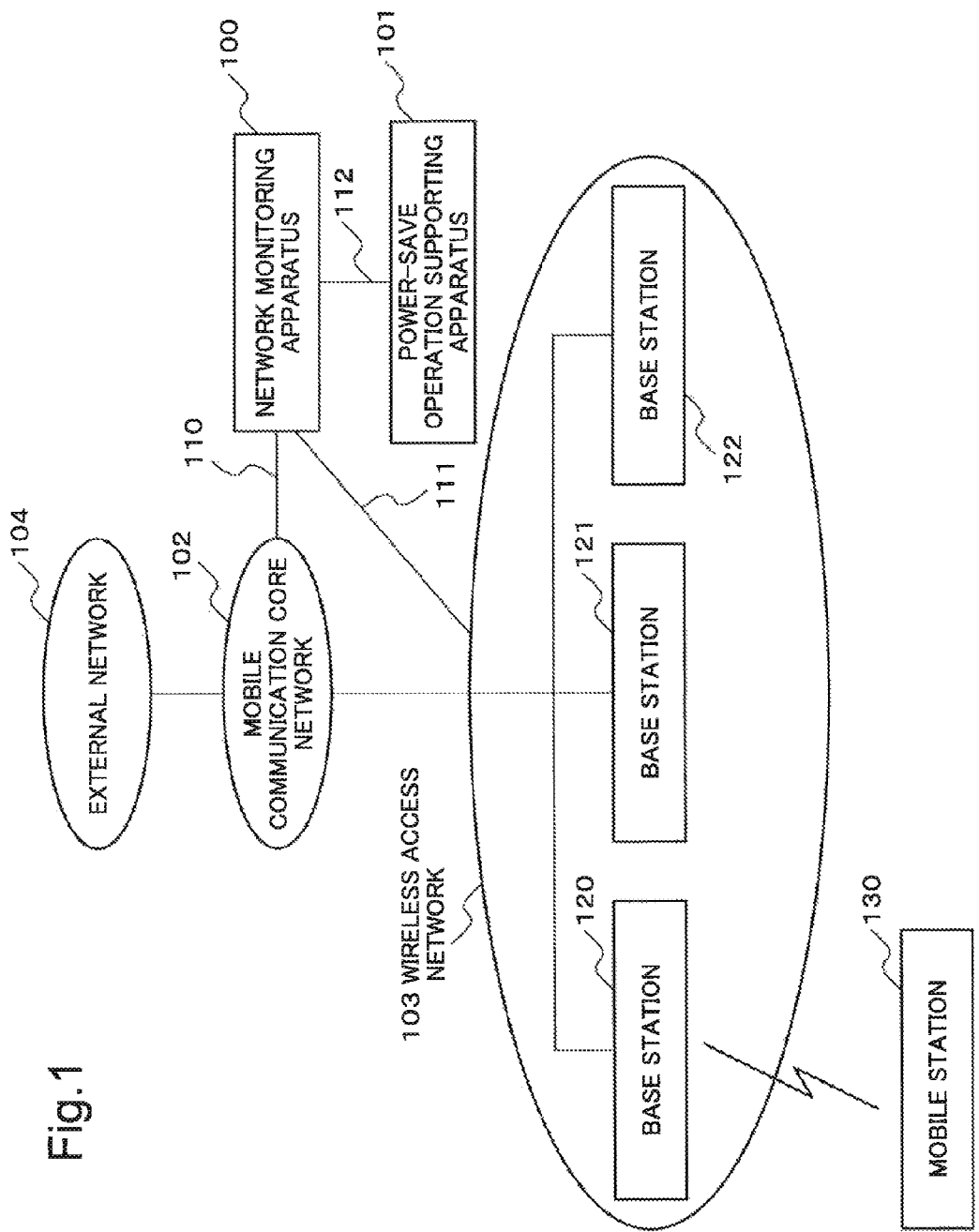
FIG. 1 is a block diagram showing an exemplary configuration of a mobile communication system including a power-save operation supporting apparatus according to a first exemplary embodiment of the present invention.

FIG. 1 is a block diagram showing an exemplary configuration of a mobile communication system including a power-save operation supporting apparatus 101 according to a first exemplary embodiment of the present invention. A network monitoring apparatus 100 is connected with a mobile communication core network 102 via a wired link 110. The mobile communication core network 102 is connected with an external network 104. Moreover, the network monitoring apparatus 100 is connected with a wireless access network 103 via a wired link 111. The wireless access network 103 accommodates a plurality of base stations 120 to 122. Each of the base stations 120 to 122 communicates with at least one mobile station 130.

The network monitoring apparatus 100 monitors a communication state of each of the base stations 120 to 122, and sends and receives control traffic. Moreover, the network monitoring apparatus 100 monitors a wireless parameter and service quality of each of the base stations 120 to 122.

The power-save operation supporting apparatus 101 is connected with the network monitoring apparatus 100 via a wired link 112. The power-save operation supporting apparatus 101 selects the base station, to which power-save control can be carried out, with restraining emergence of an area in which the service quality is degraded, and outputs power-save control information on a change in the wireless parameters or the like of the base station and a surrounding base station which surrounds the base station, and supports a power-save operation. Specifically, the power-save operation supporting apparatus 101 estimates degree of degradation of the service quality caused after carrying out the power-save control, and selects a candidate base station to which the power-save control should be carried out. Hereinafter, "area whose service quality is degraded" may be called "degrading area" in some cases.

Figure 2:
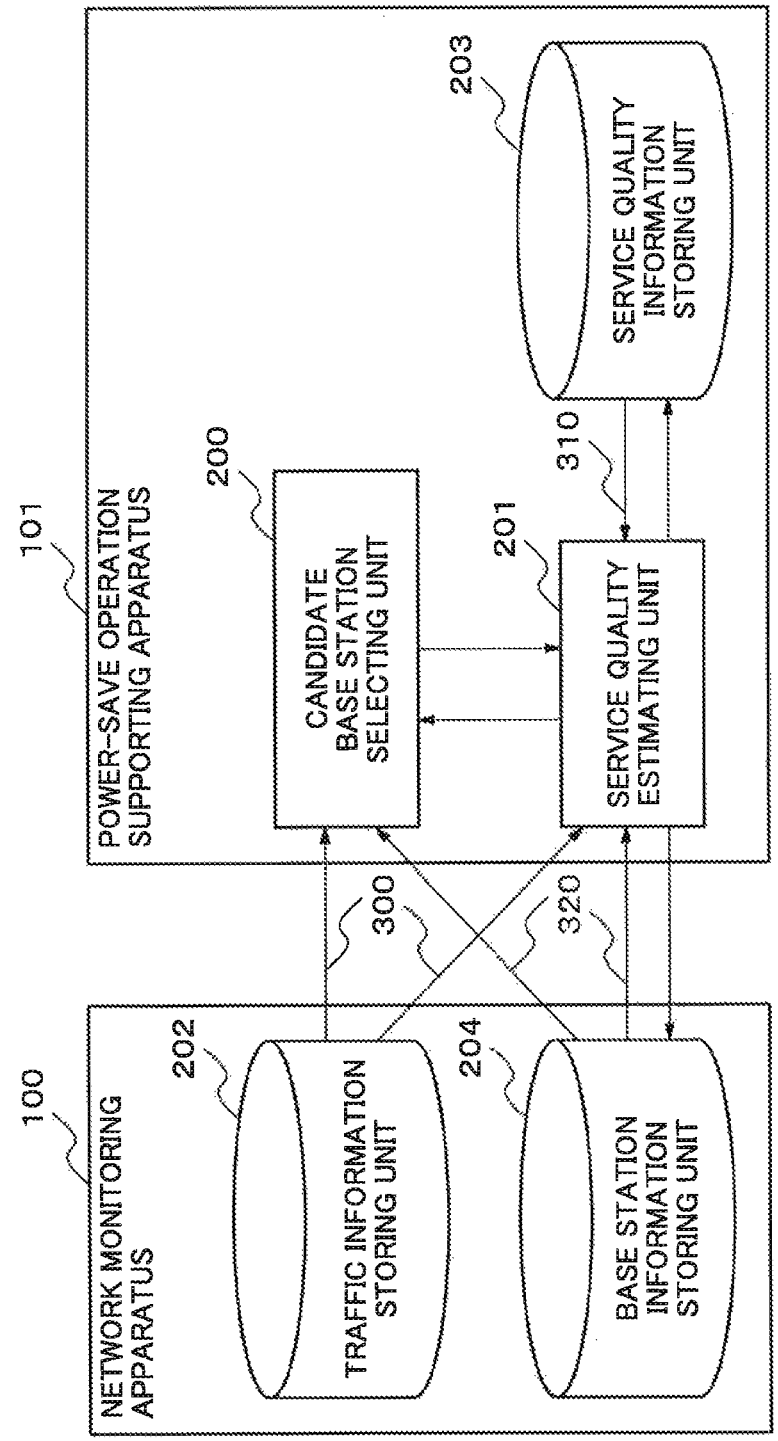
FIG. 2 is a block diagram showing an exemplary configuration of a network monitoring apparatus and the power-save operation supporting apparatus shown in FIG. 1.

FIG. 2 is a block diagram showing exemplary configurations of the network monitoring apparatus 100 and the power-save operation supporting apparatus 101 shown in FIG. 1.

The network monitoring apparatus 100 includes a traffic information storing unit 202 and a base station information storing unit 204.

FIG. 3 is a table showing an example of traffic information 300 which the traffic information storing unit 202 shown in FIG. 2 stores. In this case, a wireless base station ID (Identification) 301, a wireless cell ID 302, number of calls 303, traffic intensity 304 and number of mobile stations 305 are specified in the traffic information 300.

FIG. 4 is a table showing an example of base station information 320 which the base station information storing unit 204 shown in FIG. 2 stores. In this case, the base station ID 301, the wireless cell ID 302, a base station location 321, wireless cell cover area 322, wireless cell cover area after control 323, an antenna parameter 324 and power consumption 325 are specified in the base station information 320.

The power-save operation supporting apparatus 101 includes a candidate base station selecting unit 200 (selection means), a service quality estimating unit 201 (estimation means) and a service quality information storing unit 203.

The candidate base station selecting unit 200 inputs an estimation result on the service quality of each evaluation area from the service quality estimation unit 201. Moreover, the candidate base station selecting unit 200 inputs the traffic information 300 and the base station information 320 from the network monitoring apparatus 100. The candidate base station selecting unit 200 estimates the degree of the degradation of the service quality caused after carrying out the power-save control, which includes changing the wireless parameter of the surrounding base station, by use of these inputted information. Then, the candidate base station selecting unit 200 selects the base station, whose estimated degree of the degradation is lower than a predetermined threshold value, as the candidate base station to which the power-save control should be carried out. Here, the degree of the degradation of the service quality is estimated actually by the service quality estimating unit 201 in reply to a request of the candidate base station selecting unit 200.

The service quality estimating unit 201 inputs service quality information 310 from the service quality information storing unit 203. Moreover, the service quality estimating unit 201 inputs the traffic information 300 and the base station information 320 from the network monitoring unit 100. The service quality estimating unit 201 estimates the degree of the degradation of the service quality, which is caused in each of the base stations 120 to 122, by use of these pieces of inputted information in reply to the request of the candidate base station selecting unit 200. For example, the service quality estimating unit 201 compares a spatial size of a cover area of each base station, which satisfies predetermined receiving electric field intensity or predetermined signal to interference ratio and which is observed before and after carrying out the power-save control, and then the service quality estimating unit 201 estimates the degree of the degradation of the service quality. Here, it is possible to acquire the service quality information 310 on the basis of estimation or measurement information on propagation.

FIG. 5 is a table showing an example of the service quality information 310 which the service quality information storing unit 203 shown in FIG. 2 stores. The service quality information 310 includes evaluation point quality information 317 and cell quality information 318. In this case, an evaluation point 311, received electric field intensity 312 and signal to interference ratio 313 are specified as the evaluation point quality information 317. The base station ID 301, the wireless cell ID 302, average throughput 314, number of handover (denoted as HO in FIG. 5) trials 315 and number of successful handover trials 316 are specified as the cell quality information 318.

Figure 6:
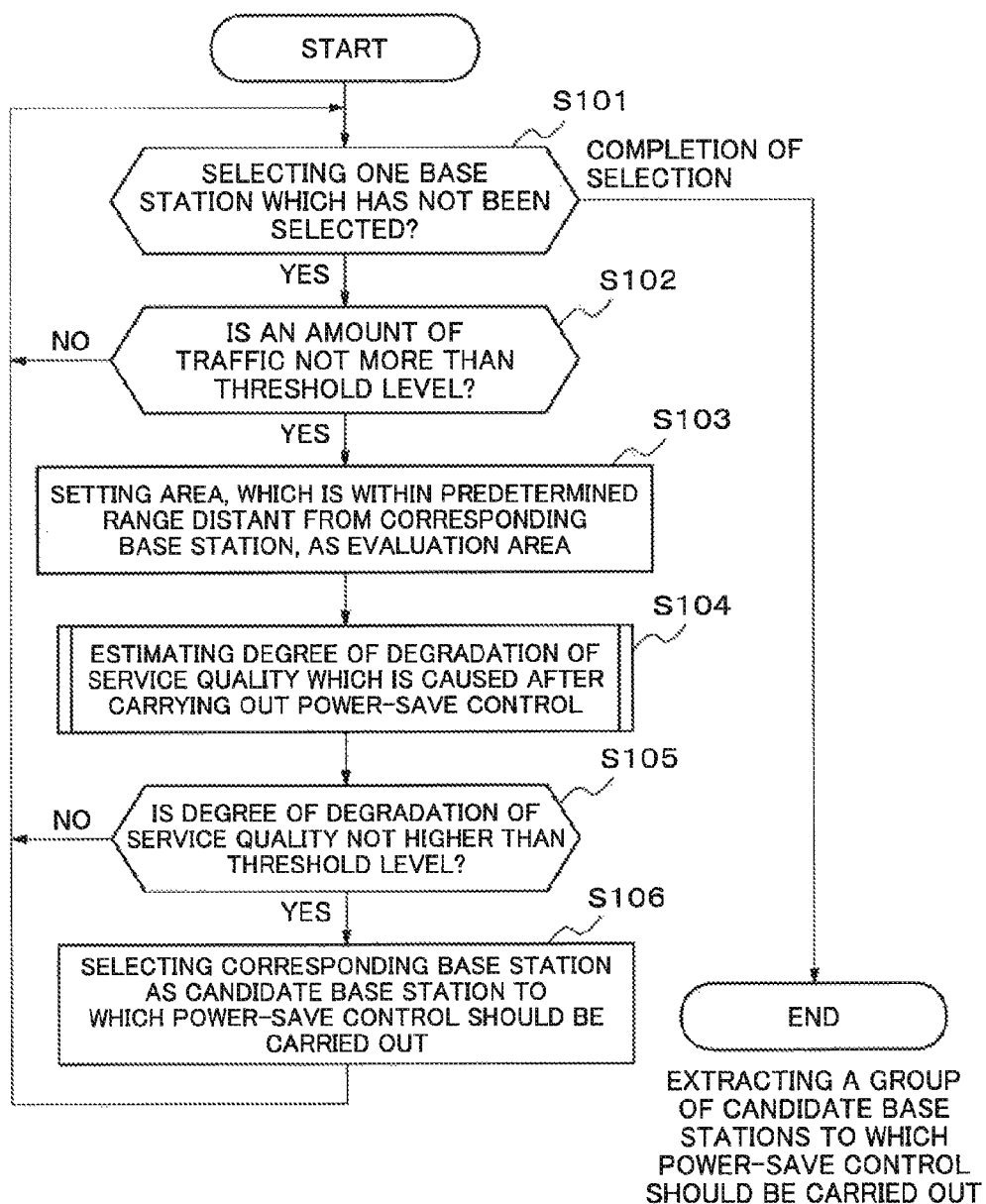
FIG. 6 is a flowchart showing an example of an operation (an example of an operation of selecting a candidate base station) of the power-save operation supporting apparatus shown in FIG. 2.

FIG. 6 is a flowchart showing an example of an operation (an example of an operation of selecting the candidate base station) of the power-save operation supporting apparatus 101. First, the candidate base station selecting unit 200 arbitrarily selects one base station out of a group of base stations which have not been selected (Step S101). On the basis of the traffic information 300 received from the network monitoring apparatus 100, the candidate base station selecting unit 200 judges whether an amount of traffic of the selected base station is not more than a predetermined threshold level (Step S102). In the case that an amount of the traffic is more than the threshold level ("No" in Step S102), the candidate base station selecting unit 200 selects another base station, which has not been selected, in Step S101. In the case that an amount of the traffic is not more than the predetermined threshold level ("Yes" in Step S102), the candidate base station selecting unit 200 sets a predetermined range of area, which includes the cover area of the surrounding base station and which has an influence on the service quality, as an evaluation area when the candidate base station selecting unit 200 carries out the power-save control to the selected base station (Step S103). Furthermore, the candidate base station selecting unit 200 estimates the degree of the degradation of the service quality after carrying out the power-save control to the selected base station (Step S104). Specifically, estimating the degree of the degradation of the service quality is carried out by the service quality estimating unit 201. Detailed description on estimating the degree of the degradation of the service quality (in other words, an operation carried out by the service quality estimating unit 201) will be provided later. The candidate base station selecting unit 200 judges whether the degree of the degradation of the service quality, which is caused after the power-save control, is not higher than a predetermined threshold level (Step S105). In the case that the degree of the degradation of the service quality is higher than the predetermined threshold level (in the case of "No" in Step S105), the candidate base station selecting unit 200 selects another base station, which has not been selected, in Step S101. In the case that the degree of the degradation of the service quality is not higher than the predetermined threshold level (in the case of "Yes" in Step S105), the candidate base station selecting unit 200 selects the selected base station as the candidate base station to which the power-save control should be carried out (Step S106). The same process is carried out to every base station. When selection of the base station, which has not been selected, is completed (in the case of "completion of selection" in Step S101), the operation of the candidate base station selecting unit 200 ends. In this case, information on the candidate base station (a group of the candidate base stations), to which the power-save control should be carried out, is extracted, and the power-save control is carried out on the basis of the information.

Figure 7:
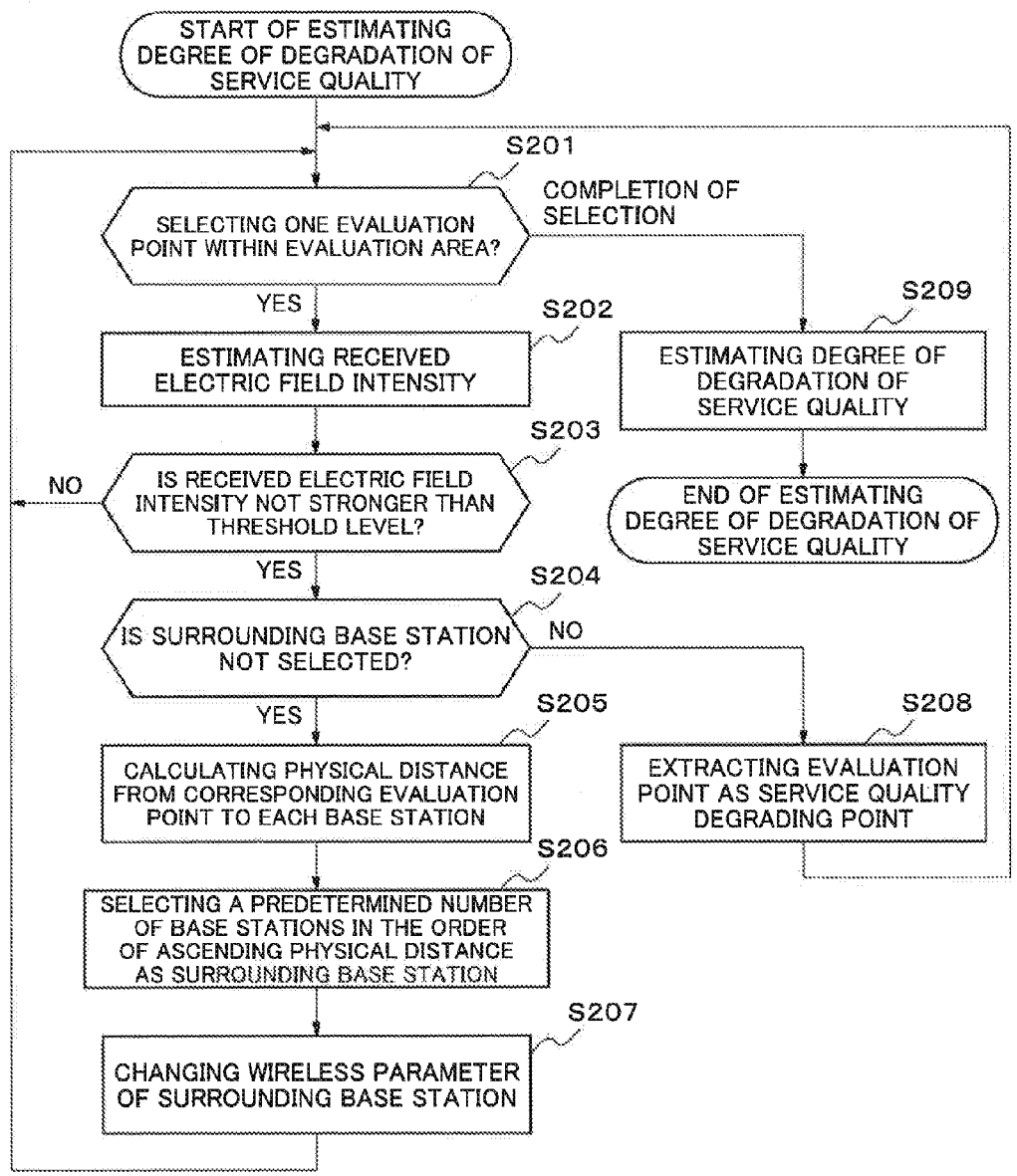
FIG. 7 is a flowchart showing an example of an operation (an example of an operation of estimating degree of degradation of service quality) of the power-save operation supporting apparatus shown in FIG. 2.

FIG. 7 is a flowchart showing an example of an operation (an example of an operation of estimating the degree of the degradation of the service quality) of the power-save operation supporting apparatus 101. First, the service quality estimating unit 201 selects one evaluation point out of a plurality of the evaluation points which are arranged in a shape of a grid within the evaluation area (predetermined range of the area which includes the cover area of the surrounding base station and which has an influence on the service quality) (Step S201). The service quality estimating unit 201 estimates the received electric field intensity at the selected evaluation point (Step S202). The service quality estimating unit 201 judges whether the estimated received electric field intensity is not stronger that a predetermined threshold level (Step S203). In the case that the estimated received electric field intensity is stronger than the predetermined threshold level (in the case of "No" in Step S203), the service quality estimating unit 201 selects another evaluation point. In the case that the estimated received electric field intensity is not stronger than the predetermined threshold level (in the case of "Yes" in Step S203), the service quality estimating unit 201 judges whether the surrounding base station is selected in relation to the evaluation point (Step S204). In the case that the surrounding base station is not selected (in the case of "Yes" in Step S204), the service quality estimating unit 201 calculates a physical distance from the evaluation point to each base station on the basis of location information 321 on each base station which is provided by the base station information storing unit 204 (Step 205). Moreover, a predetermined number of the base stations are selected as the surrounding base station in the order of ascending physical distance on the basis of the calculation result (Step S206). Then, the service quality estimating unit 201 changes the wireless parameter of the surrounding base station in order to decrease the points whose service quality is degraded due to the power-save control (Step S207). The service quality estimating unit 201 improves the service quality through estimating the receiving electric field intensity which is caused after the power-save control, and changing the wireless parameter of the surrounding base station for each evaluation point in the same way.

In the case that the surrounding base station related to the evaluation position has been already selected (in the case of "No" in Step S204), the service quality estimating unit 201 extracts the evaluation point, at which the service quality can not be improved even if the wireless parameter of the surrounding base station is changed, as the service quality degrading point (Step S208). Finally, the service quality estimating unit 201 compares the service quality degrading point before and after the power-save control is carried out, and then estimates the degree of the degradation of the service quality (Step S209). The result of estimating the degree of the degradation of the service quality is transferred to the candidate base station selecting unit 200. At this time, estimating the degree of the degradation of the service quality is ended.

Here, the wireless parameter related to the process in Step S207 includes, for example, an inclination angle of an antenna, transmitted power and a handover parameter. The wireless parameter is changed based on a predetermined algorithm. Here, since the predetermined algorithm, for example, for controlling the inclination angle of the antenna is known well among persons skilled in the art as shown in the non-patent document 1, description on the predetermined algorithm is omitted.

Moreover, it is also possible to use "signal to interference ratio" instead of "received electric field intensity" in the process of Step S202.

Moreover, it is also possible to use "path loss" instead of "physical distance" in the process of Step S205. In this case, the process of Step S206 is changed from "process of selecting a predetermined number of the base stations in an order of the short physical distance as the surrounding base station" to "process of selecting the base station, whose path loss is not larger than a predetermined threshold level, as the surrounding base station".

FIG. 8 is a conceptual diagram showing an example of evaluating the degree of the degradation of the service quality according to the first exemplary embodiment. As an initial state, the base stations 120, 121 and 122 operate (refer to FIG. 8(a)). Here, the cover areas of the base stations 120, 121 and 122 are denoted as A120, A121 and A122, respectively. Hereinafter, a case that the service quality, which is caused in the case of stopping the base station 120, is estimated is exemplified (refer to FIG. 8 (b)). Here, an area where the service quality is degraded is denoted as D120 (area indicated by a slanted line in FIG. 8(b)). In order to improve the service quality (that is, in order to make D120 extinct or small in size), the wireless parameter of the surrounding base station is changed (refer to FIG. 8 (c)). At this time, the degree of the degradation of the service quality is calculated on the basis of the spatial size (size of the area indicated by a slanted line in FIG. 8(c)) of the service quality degrading area D120 whose degradation of the service quality can not be compensated and consequently emerges even through changing the wireless parameter of the surrounding base station.

According to the first exemplary embodiment described above, the base station, which has the small degree of the degradation of the service quality after the power-save control, is selected as the candidate base station to which the power-save control should be carried out. Accordingly, it is possible to reduce power consumption of the wireless access network with restraining emergence of the area whose service quality is degraded.

According to the above description, the base station whose amount of the traffic exceeds the threshold level is removed out of the candidate base stations (refer to Step S102 in FIG. 6). Accordingly, it is possible to make the power-save operation supporting process simple, and it is also possible to avoid carrying out the power-save control to the base station to which the power-save control is not necessary (to which the power-save control is forbidden).

It is needless to say that the process of removing the base station, whose amount of the traffic exceeds the threshold level, out of the candidate base station (in other words, the process that judging whether the base station is the candidate base station is carried out only to the base station whose amount of traffic is not more than the threshold level) is not always mandatory. That is, even if making all the base stations a target of the process regardless of an amount of traffic, it is possible to reduce power consumption of the wireless access network with restraining emergence of the area whose service quality is degraded.

Second Exemplary Embodiment

Hereinafter, a power-save operation supporting apparatus according to a second exemplary embodiment of the present invention will be described. Here, a configuration of a mobile communications system to which the power-save operation supporting apparatus belongs is identical with the mobile communication system shown in FIG. 1. Moreover, a configuration of the power-save operation supporting apparatus is identical with the power-save operation supporting apparatus 101 shown in FIG. 2. Accordingly, description on the system and the apparatus is omitted. A difference of the power-save operation supporting apparatus from the power-save operation supporting apparatus 101 according to the first exemplary embodiment exists in a part of operations. Hereinafter, the difference will be described.

Figure 9:
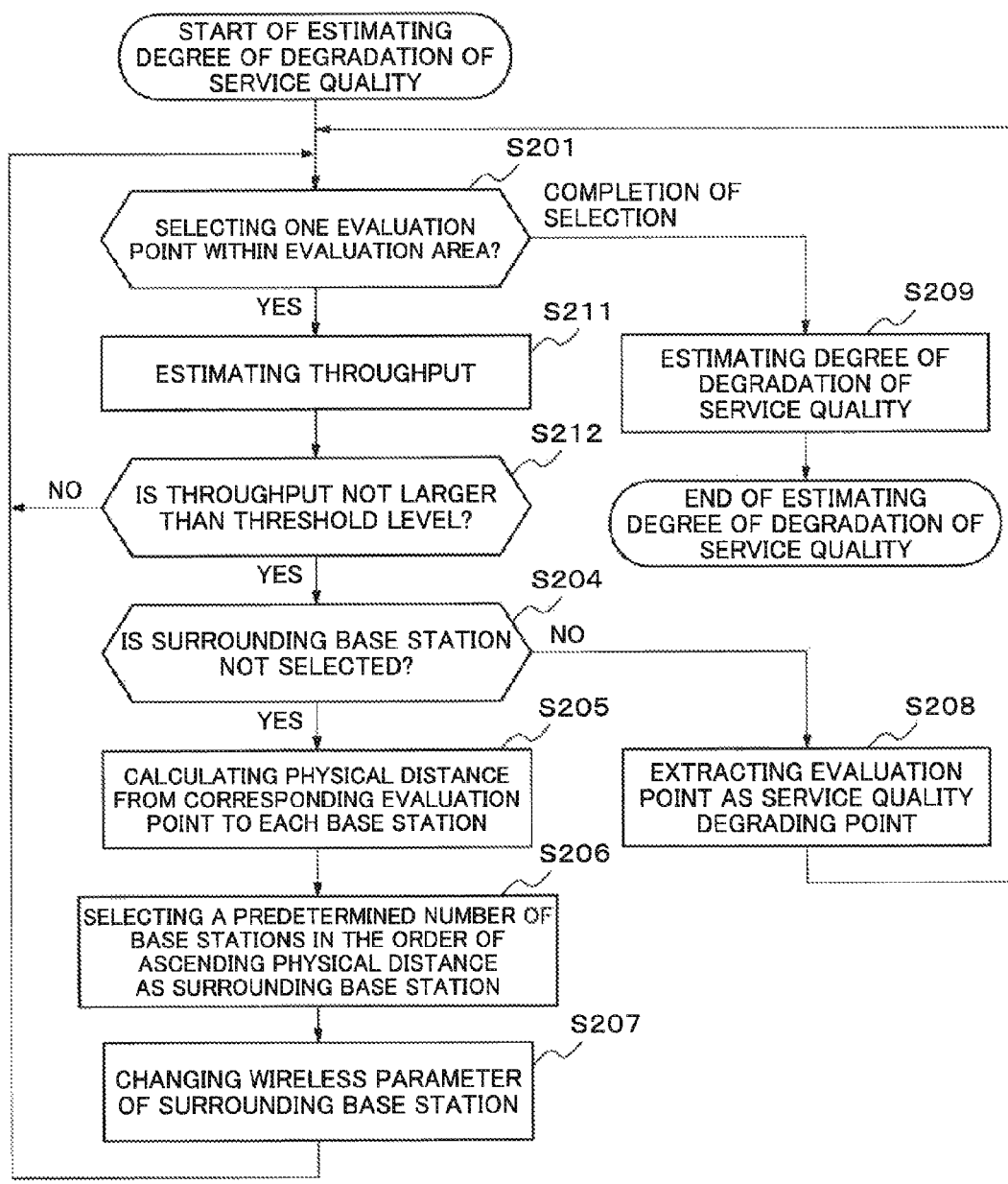
FIG. 9 is a flowchart showing an example of an operation (an example of an operation of estimating degree of degradation of service quality) of a power-save operation supporting apparatus according to a second exemplary embodiment.

FIG. 9 is a flowchart showing an example of an operation (an example of an operation of estimating the degree of the degradation of the service quality) of the power-save operation supporting apparatus according to the second exemplary embodiment. The operation is the same basically as the operation of the power-save operation supporting apparatus 101 according to the first exemplary embodiment shown in FIG. 7. However, FIG. 7 and FIG. 9 are different each other in the following point. According to FIG. 7, "received electric field intensity" at the selected evaluation point is estimated (Step S202), and is compared with the threshold level related to the received electric field intensity (Step S203). In contrast, "throughput" at the selected evaluation point is estimated according to FIG. 9 (Step S211), and is compared with a threshold level related to the throughput (Step S212). That is, while the degree of the degradation of the service quality after the power-save control is evaluated on the basis of the spatial size of the area whose received electric field intensity is low according to the first exemplary embodiment, the degree of the service quality is evaluated on the basis of a spatial size of an area whose throughput is low according to the second exemplary embodiment. This is a different point between the first exemplary embodiment and the second exemplary embodiment.

According to the second exemplary embodiment described above, the throughput is used as an evaluation index for the degree of the degradation of the service quality which is caused after the power-save control. Accordingly, it is possible to reduce power consumption of the wireless access network also in a communication environment, in which packet data is processed, with restraining emergence of the area, whose service quality is degraded.

Third Exemplary Embodiment

Hereinafter, a power-save operation supporting apparatus according to a third exemplary embodiment of the present invention will be described. Here, a configuration of a mobile communications system to which the power-save operation supporting apparatus belongs is identical with the mobile communication system shown in FIG. 1. Moreover, a configuration of the power-save operation supporting apparatus is identical with the power-save operation supporting apparatus 101 shown in FIG. 2. Accordingly, description on the system and the apparatus is omitted. A difference of the power-save operation supporting apparatus from the power-save operation supporting apparatus 101 according to the first exemplary embodiment exists in a part of operations. Hereinafter, the difference will be described.

Figure 10:
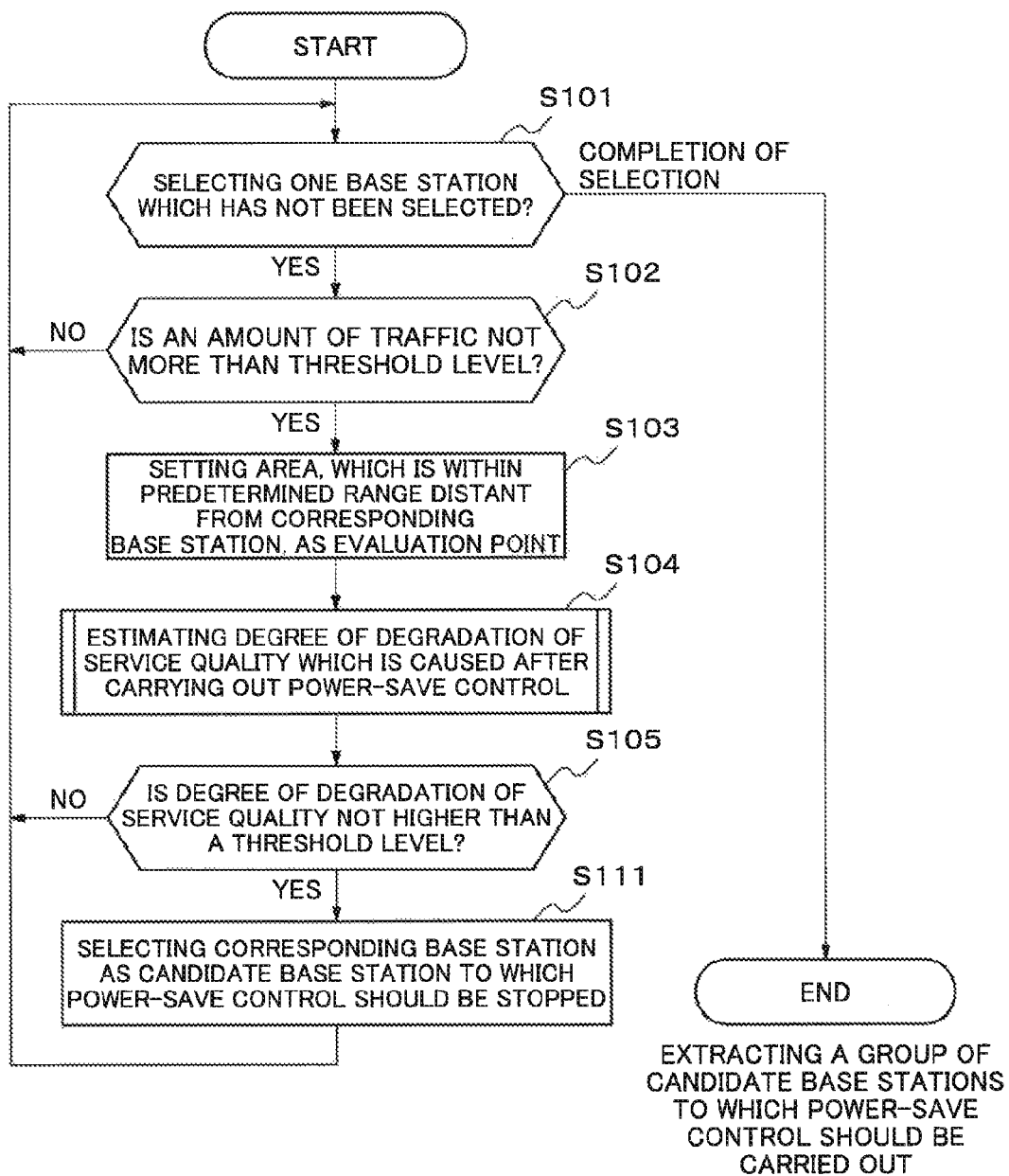
FIG. 10 is a flowchart showing an example of an operation (an example of an operation of selecting a candidate base station) of a power-save operation supporting apparatus according to a third exemplary embodiment.

FIG. 10 is a flowchart showing an example of an operation (an example of an operation of selecting the candidate base station) of the power-save operation supporting apparatus according to the third exemplary embodiment. The operation is the same basically as the operation of the power-save operation supporting apparatus 101 according to the first exemplary embodiment shown in FIG. 7. However, control to stop a wireless sending unit of the selected base station (Step S111) is carried out as the power-save control according to the exemplary embodiment, in the case that the degree of the degradation of the service quality is not higher than a predetermined threshold level (in the case of "Yes" in Step S105 of FIG. 10).

An effect of the above-mentioned third exemplary embodiment will be described. It is generally known that it is possible to reduce electric power of the base station, which is consumed constantly with no relation to existence of the sending signal, through carrying out the control of stopping the wireless sending unit. According to the exemplary embodiment, since the power-save control includes the control of stopping the wireless sending unit of the selected base station, it is possible to improve the power-save effect of the wireless access network furthermore.

Fourth Exemplary Embodiment

Figure 11:
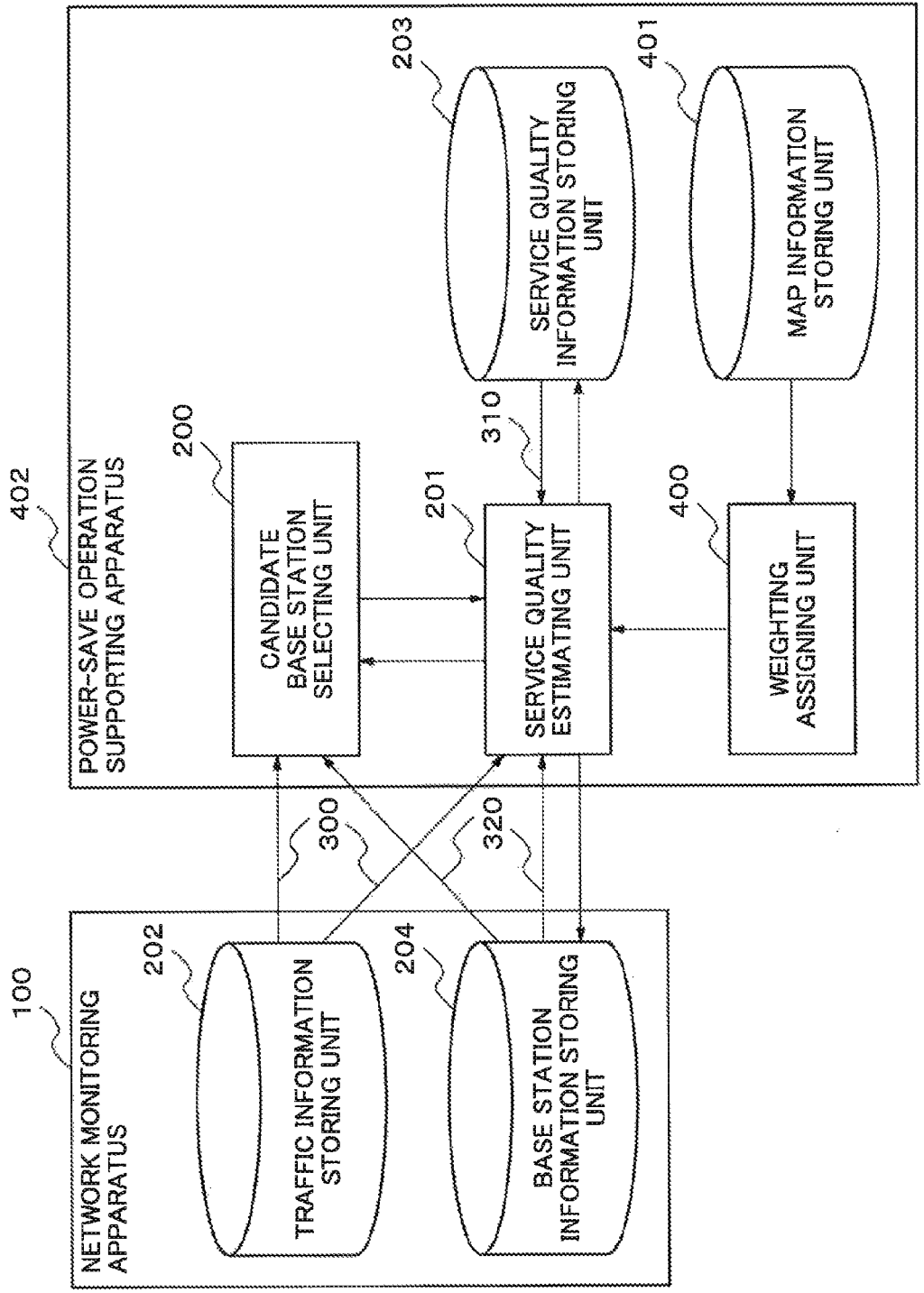
FIG. 11 is a block diagram showing an exemplary configuration of a power-save operation supporting apparatus according to a fourth exemplary embodiment of the present invention.

FIG. 11 is a block diagram showing an exemplary configuration of a power-save operation supporting apparatus 402 according to a fourth exemplary embodiment of the present invention. The power-save operation supporting apparatus 402 includes a weighting assigning unit 400 (weighting assigning means) and a map information storing unit 401 in addition to the configuration of the power-save operation supporting apparatus 101 shown in FIG. 2 according to the first exemplary embodiment.

Figure 12:
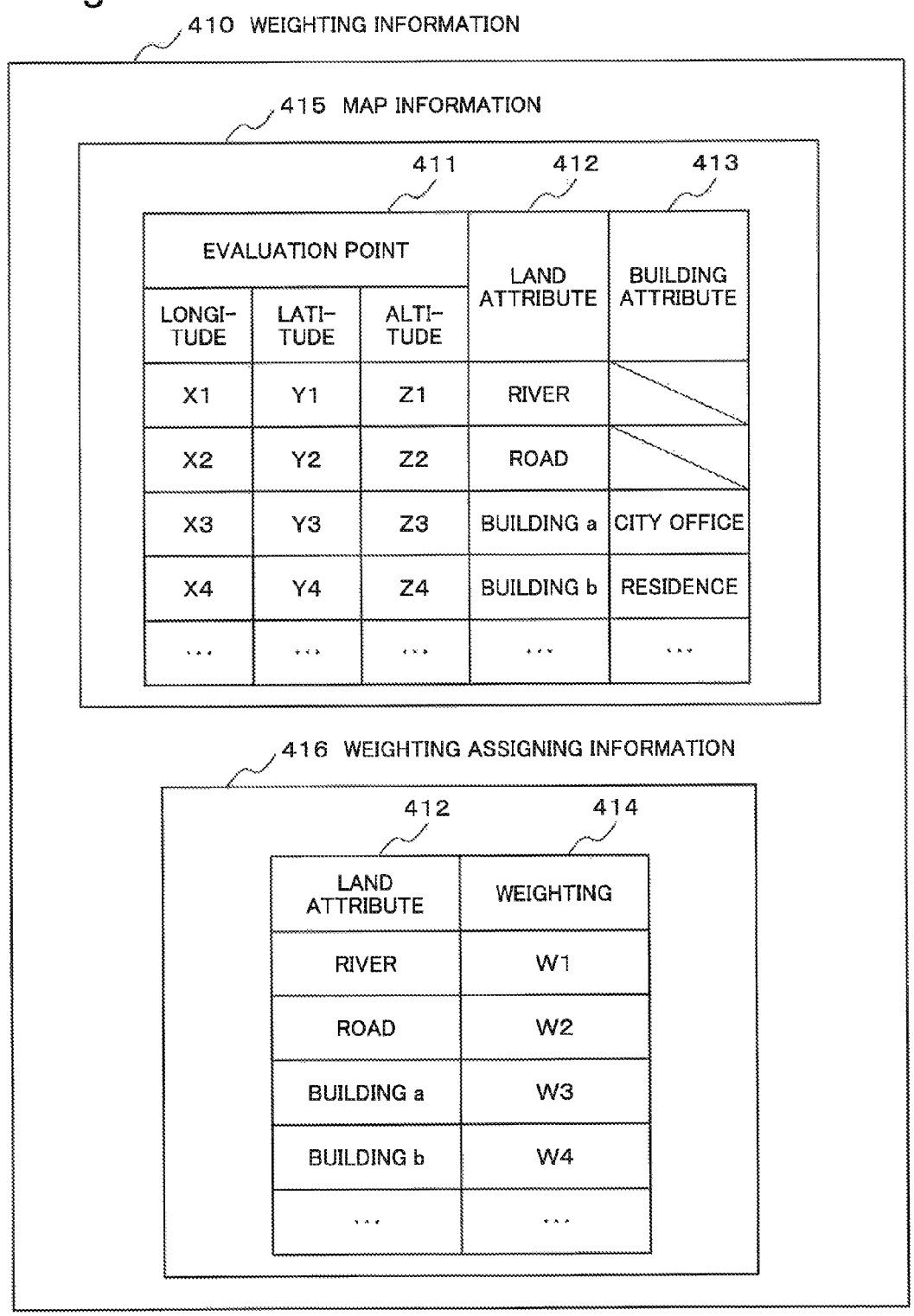
FIG. 12 is a table showing an example of weighting information which a map information storing unit shown in FIG. 11 stores.

FIG. 12 is a table showing an example of weighting information 410 which the map information storing unit 401 stores. The weighting information 410 includes map information 415 and weighting assigning information 416. A land attribute 412 and a building attribute 413, which can be extracted from road information, building information, river information, altitude information, and information on classification of land usage, density of population, or the like, are specified in the map information 415 for each evaluation point 411.

The weighting assigning unit 400 assigns a weighting to the evaluation point with taking account of influence on a user which is set in advance, such as a public property of a building or the like. Specifically, the weighting assigning unit 400 creates the weighting assigning information 416 (refer to FIG. 12) in the weighting information 410. Here, it may be preferable that the same weighting is assigned to every evaluation area or it may be preferable that the weightings, which are different each other, are assigned to the evaluation points respectively.

Figure 13:
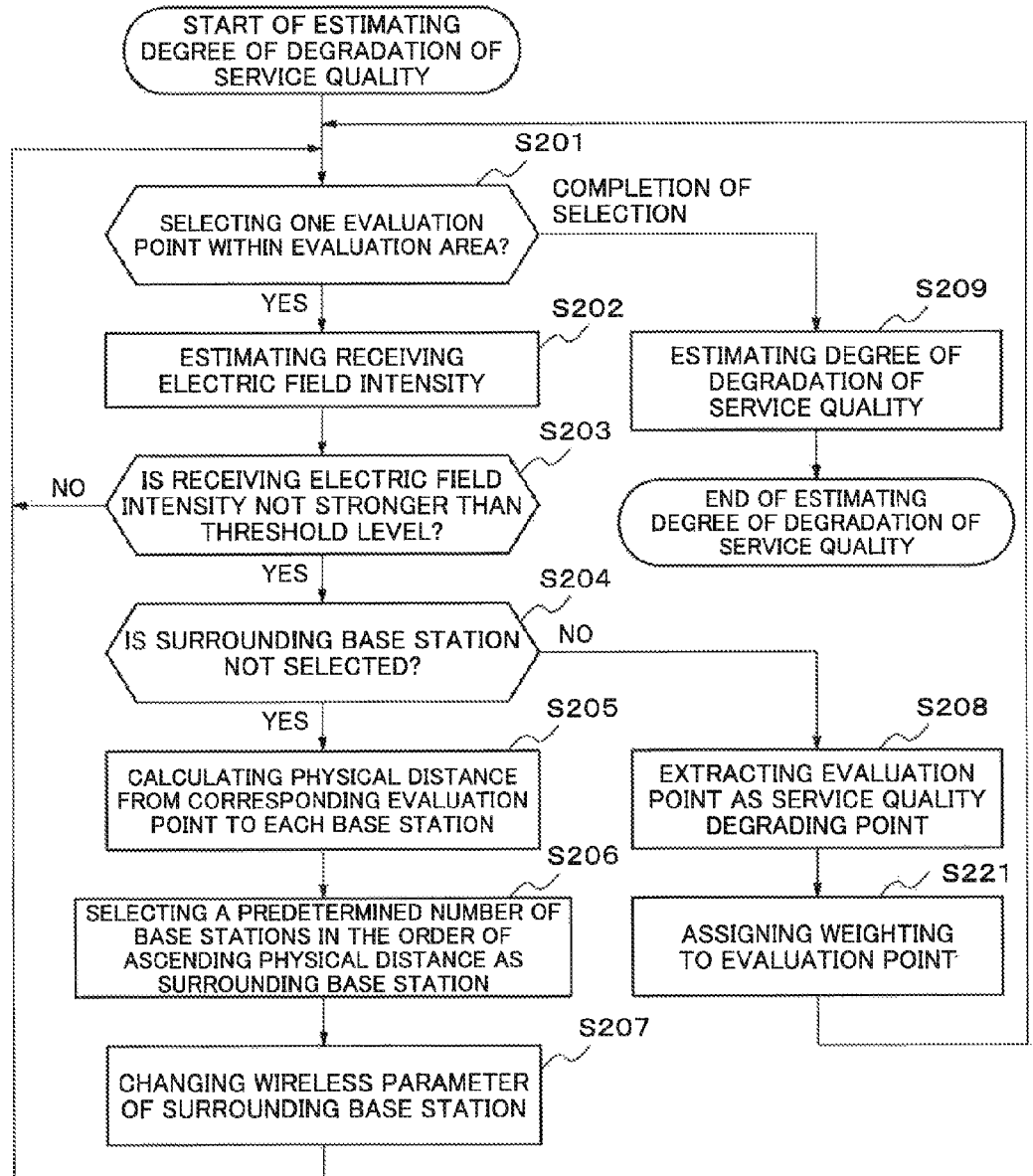
FIG. 13 is a flowchart showing an example of an operation (an example of an operation of estimating degree of degradation of service quality) of a power-save operation supporting apparatus shown in FIG. 11.

FIG. 13 is a flowchart showing an example of an operation (an example of an operation of estimating the degree of the degradation of the service quality) of the power-save operation supporting apparatus 402 shown in FIG. 11. Here, since the operation related to a whole of the power-save operation support according to the fourth exemplary embodiment is identical with one according to the first exemplary embodiment shown in FIG. 6, description on the operation is omitted. A difference point of FIG. 13 (fourth exemplary embodiment) from FIG. 7 (first exemplary embodiment) is that a weighting process (Step S221) carried out to the extracted service quality degrading point (extracted in Step S208) is added furthermore according to FIG. 13. Specifically, the weighting process is carried out by cooperation of the service quality estimating unit 201, the weighting assigning unit 400 and the map information storing unit 401.

Figure 14:
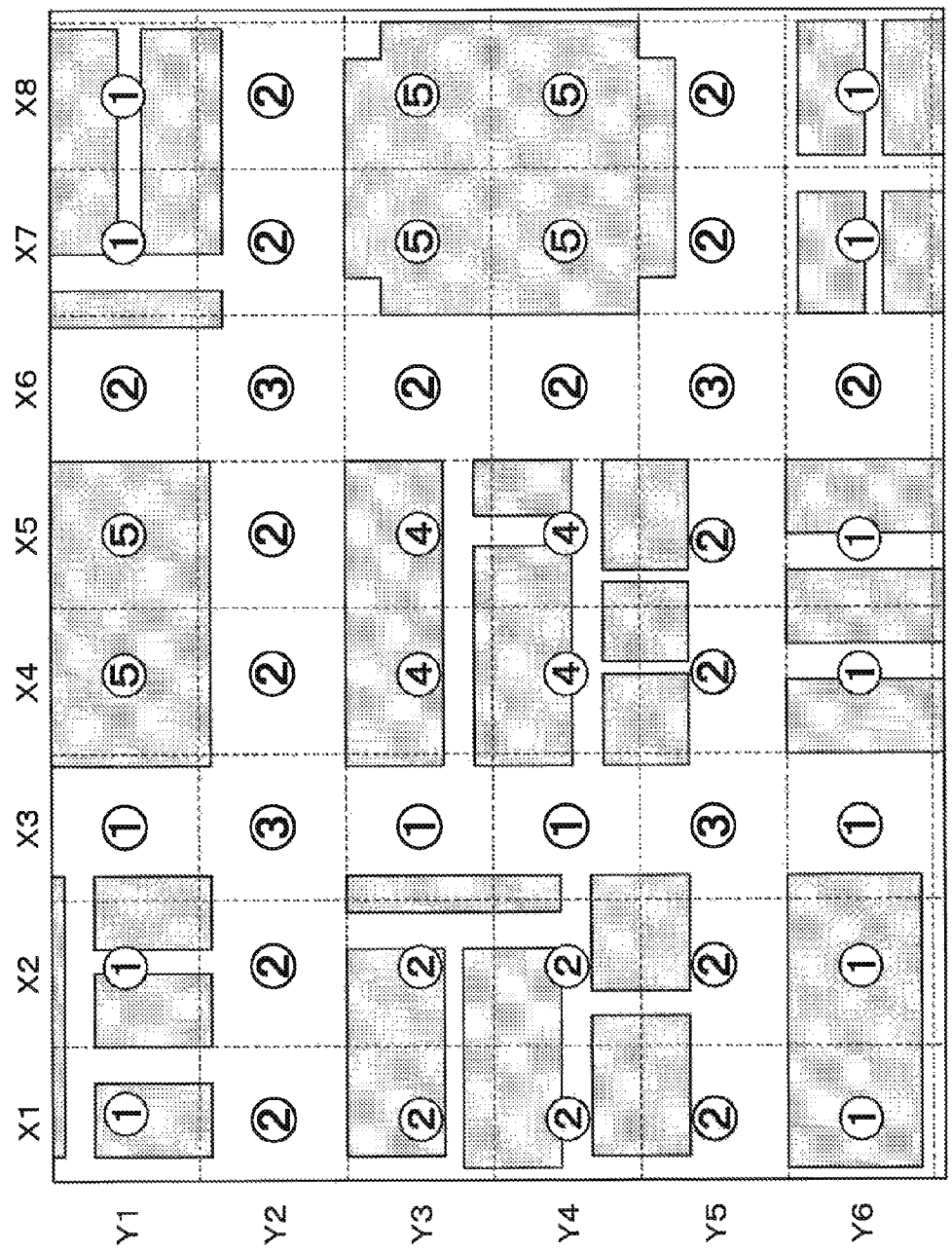
FIG. 14 shows an exemplary weighting assigning process, which is carried out by the power-save operation supporting apparatus shown in FIG. 11, to assign a weighting to an evaluation point.

FIG. 14 shows an example of the weighting process, which is carried out by the power-save operation supporting apparatus 402 shown in FIG. 11, to assign the weighting to the evaluation point. First, the weighting assigning unit 400 divides a map into a form of a grid whose unit size is predetermined (X1Y1, X2Y2, . . . in FIG. 14) and sets the evaluation point (indicated by a circle in FIG. 14) at a center of the unit of the grid. Next, on the basis of the land attribute 412 which is acquired from the map information 415 (refer to FIG. 12), the building attribute 413, and a weighting 414 which is set in advance for each land attribute, the weighting assigning unit 400 assigns the weighting (indicated by number which is written in the circle) to the evaluation point. For example, the large weighting is assigned to the evaluation point which influences the user severely when the service quality is degraded. The service quality estimating unit 201 multiplies a spatial size of the area, whose service quality is degraded, by the weighting, and then the multiplication result is used for evaluating the degree of the degradation of the service quality. In the case that the power-save control is carried out to a base station x, the unit area of the grid including an evaluation point i, whose service quality is degraded, is denoted as Si, and the weighting of the evaluation point is denoted as Wi, and the degree of the degradation of the service quality is denoted as Dx. Then, in the case that the service quality at n+1 evaluation points (i=0, . . . , n) within the evaluation area is degraded, the degree of the degradation of the service quality is expressed by the following formula 1.

$$D_x = \sum_{i=0}^{n} W_i \times S_i \qquad \text{(Formula 1)}$$

According to the fourth exemplary embodiment described above, it is possible to evaluate correctly not only the spatial size of the service quality, but also the service quality through carrying out the weighting process to the area with taking account of the influence on the user. That is, it is possible to restrain furthermore the degree of the degradation of the service quality through selecting the base station, to which the power-save control should be carried out, with taking account of the influence on the user.

Here, according to the above mention, the case that the fourth exemplary embodiment (that is, configuration to calculate the degree of the degradation of the service quality with taking account of the weighting which is assigned to the evaluation point) is applied to the first exemplary embodiment is exemplified as an example to which the fourth exemplary embodiment is applied. Furthermore, it is possible that the fourth exemplary embodiment can be applied to the second exemplary embodiment, the third exemplary embodiment, or a combination of any at least two out of the first to the third exemplary embodiments.

Fifth Exemplary Embodiment

Hereinafter, a power-save operation supporting apparatus according to a fifth exemplary embodiment of the present invention will be described. Here, a configuration of a mobile communications system to which the power-save operation supporting apparatus belongs is identical with the mobile communication system shown in FIG. 1. Moreover, a configuration of the power-save operation supporting apparatus is identical with the power-save operation supporting apparatus 101 shown in FIG. 2. Accordingly, description on the system and the apparatus is omitted. A difference of the power-save operation supporting apparatus from the power-save operation supporting apparatus 101 according to the first exemplary embodiment exists in a part of operations. Hereinafter, the difference will be described.

Figure 15:
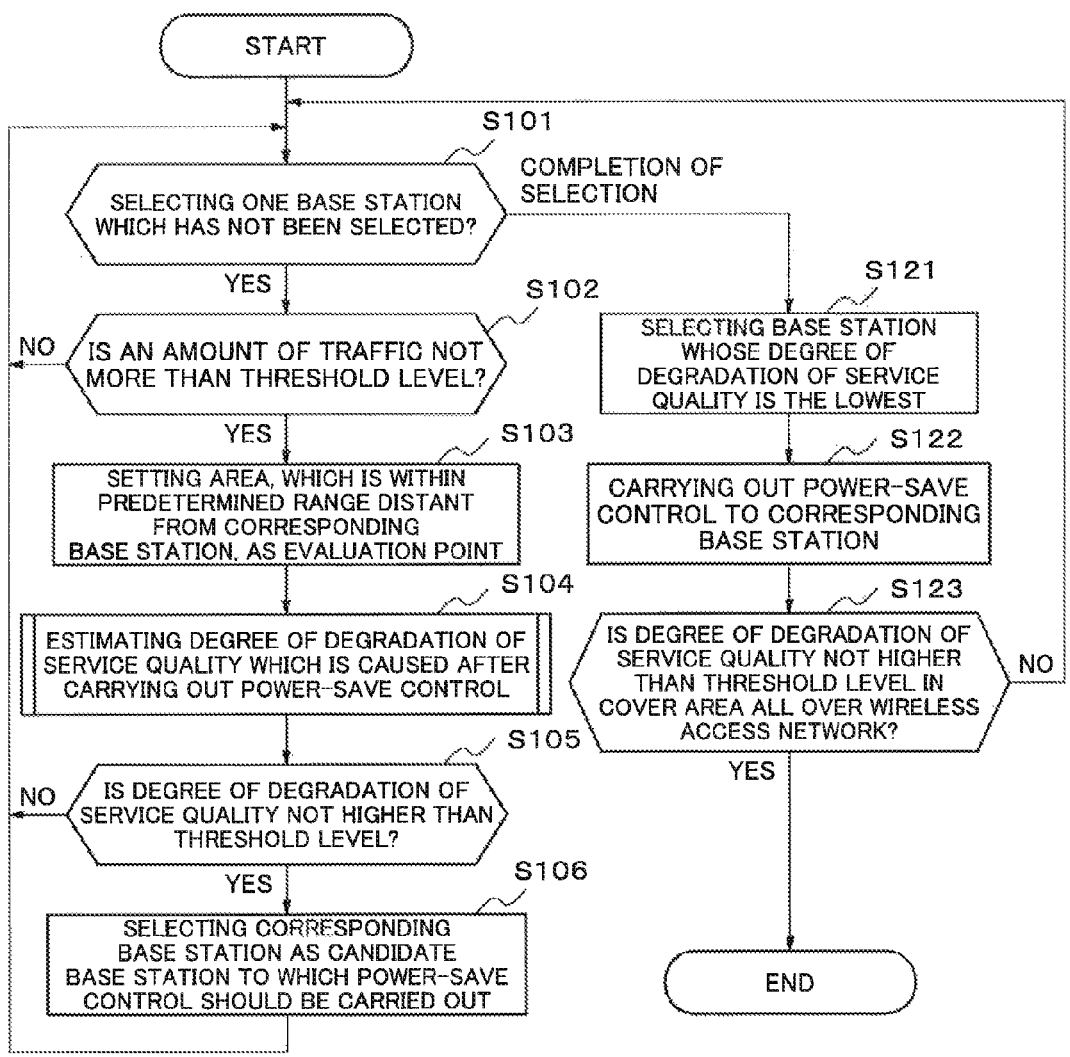
FIG. 15 is a flowchart showing an example of an operation (an example of an operation of selecting a candidate base station) of a power-save operation supporting apparatus according to a fifth exemplary embodiment.

FIG. 15 is a flowchart showing an example of an operation (an example of an operation of selecting the candidate base station) of the power-save operation supporting apparatus according to the fifth exemplary embodiment. The operation is the same basically as the operation of the power-save operation supporting apparatus 101 shown in FIG. 6 according to the first exemplary embodiment. Here, according to the first exemplary embodiment, in the case that selecting the base station, which has not been selected, is completed (in the case of "completion of selection" in Step S101), the operation of the candidate base station selecting unit 200 is ended. In contrast, additional processes (Steps S121 to S123) are carried out according to the fifth exemplary embodiment. Specifically, the candidate base station selecting unit 200 selects the candidate base station whose degree of the degradation of the service quality is the lowest out of a group of the candidate base stations (Step S121). The candidate base station selecting unit 200 notifies the network monitoring apparatus 100 of information on the change of the wireless parameters of the selected base station and the surrounding base station which surrounds the selected base station. Then, the power-save control is carried out to the candidate base station whose degree of the degradation of the service quality is the lowest (Step S122). The processes of Step S121 and Step S122 are carried out repeatedly (Step S123) until the degree of the degradation of the service quality in the cover area of a whole of the wireless access network becomes not larger than a predetermined threshold level (or an amount of the traffic load of a whole of the wireless access network is not less than a predetermined threshold level).

Here, in the case that there are a plurality of the candidate base stations whose degree of the degradation of the service quality is the lowest, it may be preferable that the base station is selected out of a plurality of the candidate base stations in an order of a small amount of changes in the wireless parameter of the surrounding base station. Furthermore, in the case that there are a plurality of the candidate base stations which make an amount of the changes in the wireless parameter of the surrounding base station the smallest, it may be preferable that the base station is selected out of a plurality of the candidate base stations in an order of a plenty of room for changing the wireless parameter.

According to the fifth exemplary embodiment described above, it is possible to realize the power-save without degrading the service quality all over the wireless access network to the utmost through carrying out the power-save control to the base station whose degree of the degradation of the service quality is the lowest.

Here, according to the above description, the case that the fifth exemplary embodiment (that is, configuration that the candidate base station, whose degree of the degradation of the service quality is the lowest, is selected out of a group of the candidate base stations) is applied to the first exemplary embodiment is exemplified as an example to which the fifth exemplary embodiment is applied. Furthermore, it is possible that the fifth exemplary embodiment can be applied to the second exemplary embodiment, the third exemplary embodiment, the fourth exemplary embodiment or a combination of any at least two out of the first to the fourth exemplary embodiments.

Sixth Exemplary Embodiment

Figure 16:
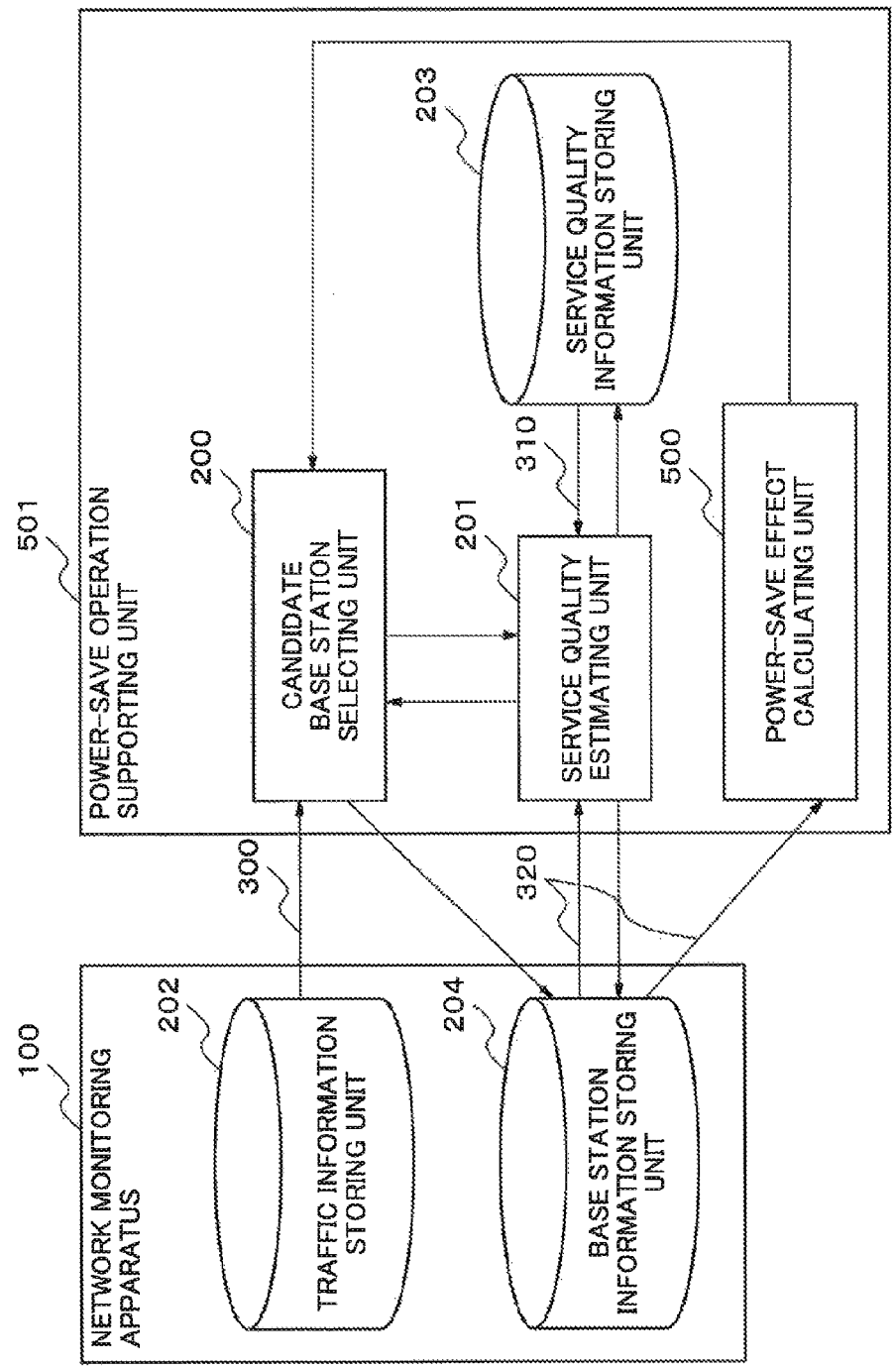
FIG. 16 is a block diagram showing an exemplary configuration of a power-save operation supporting apparatus according to a sixth exemplary embodiment of the present invention.

FIG. 16 is a block diagram showing an exemplary configuration of a power-save operation supporting apparatus 501 according to a sixth exemplary embodiment of the present invention. The power-save operation supporting apparatus 501 includes a power-save effect calculating unit 500 (power saving effect calculating means) in addition to the configuration of the power-save operation supporting apparatus 101 shown in FIG. 2. The power-save effect calculating unit 500 calculates an amount of reduced power consumption on the basis of the base station information 320 which is provided by the base station information storing unit 204.

Figure 17:
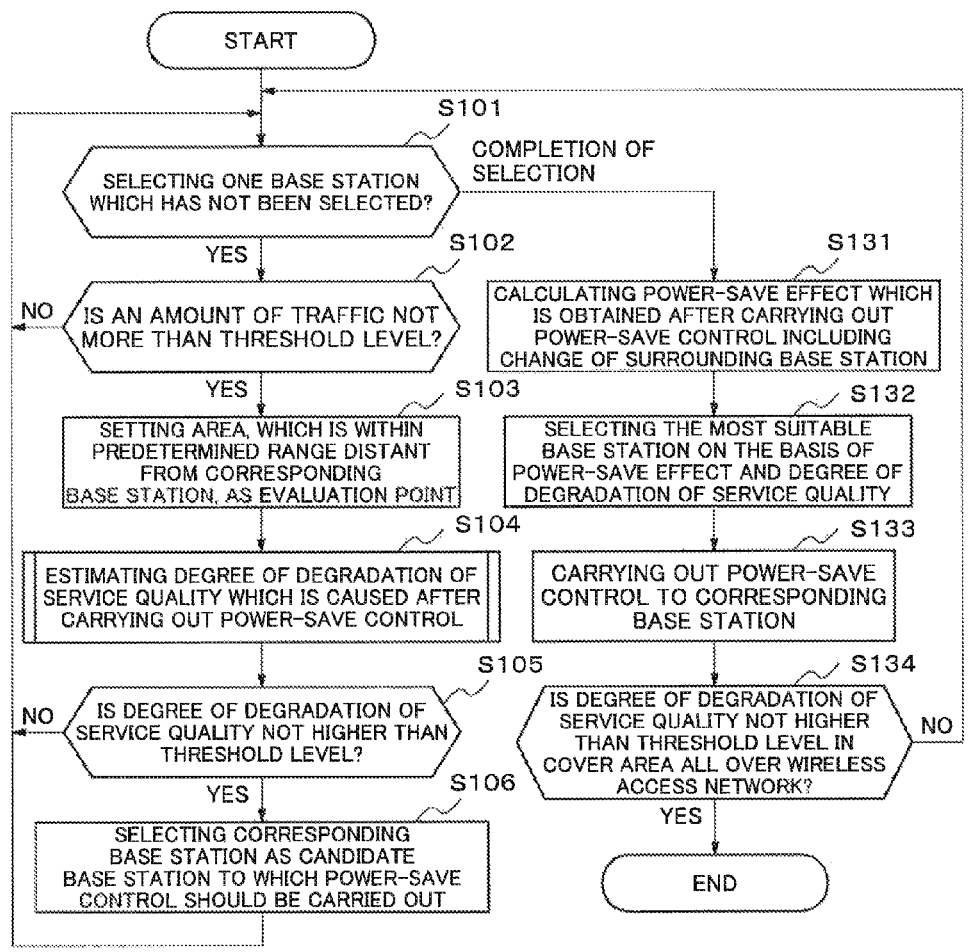
FIG. 17 is a flowchart showing an example of an operation (an example of an operation of selecting a candidate base station) of the power-save operation supporting apparatus shown in FIG. 16.

FIG. 17 is a flowchart showing an example of an operation (an example of an operation of selecting the candidate base station) of the power-save operation supporting apparatus 501 shown in FIG. 16. The operation is the same basically as one of the power-save operation supporting apparatus 101 shown in FIG. 6 according to the first exemplary embodiment. Here, according to the first embodiment, in the case that selecting the base station, which has not been selected, is completed (in the case of "completion of selection" in Step S101), the operation of the candidate base station selecting unit 200 is ended. In contrast, additional processes (Steps S131 to S134) are carried out according to the sixth exemplary embodiment. Specifically, the power-save effect calculating unit 500 calculates a power-save effect of the candidate base station which is obtained after the power-save control including the change in the wireless parameter (for example, change in the transmitted power and change in the cover area) of the surrounding base station (Step S131). Next, the candidate base station selecting unit 200 selects the most suitable candidate base station (Step S132) with taking account of "degree of the service quality" and "power-save effect" which is calculated by the power-save effect calculating unit 500. The power-save control is carried out to the most suitable candidate base station (Step S133). The processes of Step S131 to Step S133 are carried out repeatedly (Step S134) until the degree of the degradation of the service quality in the cover area of a whole of the wireless access network becomes not larger than a predetermined threshold level (or an amount of the traffic load of a whole of the wireless access network is not less than a predetermined threshold level).

Here, as a weighting coefficient common to all base stations, α is assigned to the power-save effect E, and β is assigned to the degree of the degradation of the service quality D. Moreover, the power-save effect and the degree of the degradation of the service quality, which are obtained in the case that the power-save control is carried out to the base station x, are denoted as Ex and Dx, respectively. Then, an evaluation function f (x) on selecting the candidate base station is determined, for example, by (formula 2). The evaluation function for each base station is determined, and the base station which has the maximum value is selected as the candidate base station. Here, the degree of the degradation of the service quality Dx is determined by (formula 1), and the power-save effect Ex is determined by (formula 3) which will be mentioned later. Here, the power-save effect, which is normalized, is defined to be 1 in the case that the base station can be stopped without increasing power consumption of the surrounding base station, and is defined to be 0 in the case that the power-save control is not carried out. The degree of the degradation of the service quality D, which is normalized, is defined to be 1 in the case that all evaluation points within the evaluation area are degraded, and is defined to be 0 in the case that there is no evaluation point which is degraded.

$$f(x) = \alpha E_x - \beta D_x \quad (\alpha + \beta = 1) \qquad \text{(Formula 2)}$$

FIG. 18 is a conceptual diagram showing an example of evaluating the power-save effect according to the sixth exemplary embodiment. FIG. 18 (a) shows an amount of power consumption which is consumed in an initial state (state before a base station #1 is stopped (the state will be mentioned later)), and FIG. 18 (b) shows an amount of power consumption which is consumed after the power-save control being carried out (state after the base station #1 is stopped). In other words, FIG. 18 shows an example of state transition of power consumption of the candidate base station #1 and surrounding base stations #0 and #2 which surround the candidate base station #1.

The power-save effect calculating unit 500 adds a reduced amount of power consumption of the candidate base station (for example, the base station #1), an increasing or decreasing amount of power consumption which is due to the change in the wireless parameter of the surrounding base station (for example, the base stations #0 and #2) and an increasing or decreasing amount of power consumption which is generated by an increasing or decreasing amount of traffic due to an increasing or decreasing number of the cover areas of the surrounding base station for comparison of the power consumption. As a result, the power-save effect is calculated. Here, standby power of the base stations 1, 2, 3, ..., and n at a time when the wireless sending unit of each base station is stopped is denoted as Ws1, Ws2, Ws3, ..., and Wsn, and fixed power consumption at a time when each base station operates is denoted as Wf1, Wf2, Wf3, ..., and Wfn, respectively. Furthermore, dynamic power consumption, which changes dynamically according to the traffic, before the power-saving control is denoted as Wo1, Wo2, Wo3, ..., and Won, and the dynamic power consumption after carrying out the power-save control is denoted as Wo1', Wo2', Wo3', ..., and Won', respectively. For example, in the case that the power-save control is carried out to the base station x which has m surrounding base stations, the power-save effect Ex obtained by the power-save control can be expressed by (formula 3).

$$E_x = (Wox - Wsx) - \sum_{j=1}^{m}(Woj' - Woj) \qquad \text{(Formula 3)}$$

An effect of the above-mentionedسsixth exemplary embodiment will be described. According to the usual power-save operation control, since the power-save control is carried out only on the basis of the traffic loads and the cover areas of only the base station and the surrounding base station which surrounds the base station, it is impossible to evaluate the power-save effect all over the wireless access network. Accordingly, in the case that it is possible to stop a plurality of the base stations without causing the severe degradation of the service quality, there is a possibility that it is impossible to select the candidate base station which can produce the excellent power-saving effect. According to the present exemplary embodiment, the power-save effect of each candidate base station is evaluated before the power-save control with adding an increasing or decreasing amount of the power consumption, which is due to the change in the wireless parameter of the surrounding base station, to a reduced amount of the power consumption of the base station which is generated by the power-save control. As a result, since it is possible to select the candidate base station which can produce the excellent power-save effect, it is possible to improve furthermore the power-save effect all over the wireless access network.

Here, according to the above description, the case that the sixth exemplary embodiment (that is, configuration to select the most suitable candidate base station with taking account of the degree of the degradation of the service quality and the power-save effect) is applied to the first exemplary embodiment is exemplified as an example to which the sixth exemplary embodiment is applied. Furthermore, it is possible that the sixth exemplary embodiment can be applied to the second exemplary embodiment, the third exemplary embodiment, the fourth exemplary embodiment, the fifth exemplary embodiment or a combination of any at least two out of the first to the fifth exemplary embodiments.

Here, according to the first to the sixth exemplary embodiments described above, the case that the power-save operation supporting apparatus 101 (402 and 501) is arranged outside the mobile communication core network 102 is exemplified. However, it is also possible to arrange the power-save operation supporting apparatus 101 (402 and 501) inside the mobile communication core network 102. In this case, it may be preferable to arrange the network monitoring apparatus 100 inside or outside the mobile communication core network 102.

Moreover, it is also possible to combine the power-save operation supporting apparatus 101 (402 and 501) and the network monitoring apparatus 100 together as one apparatus.

Seventh Exemplary Embodiment

Figure 19:
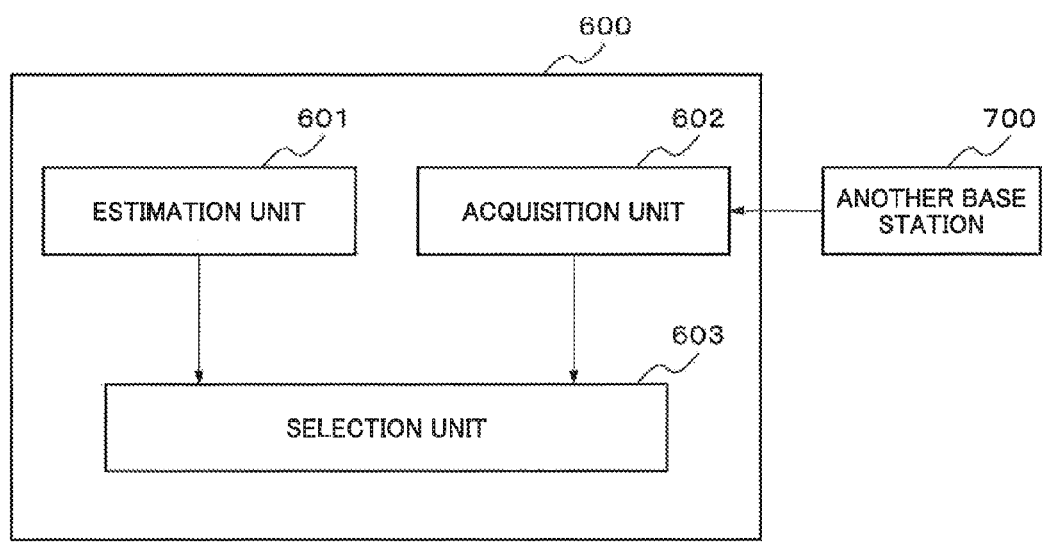
FIG. 19 is a block diagram showing an exemplary configuration of a base station according to a seventh exemplary embodiment of the present invention.

FIG. 19 is a block diagram showing an exemplary configuration of a base station 600 according to a seventh exemplary embodiment of the present invention. The base station 600 is at least one base station out of a plurality of base stations to which the power-save control can be carried out. The base station 600 includes an estimation unit 601 (estimation means), an acquisition unit 602 (acquisition means) and a selection unit 603 (selecting means).

The estimation unit 601 estimates the degree of the degradation of the service quality in the case that the power-save control is carried out to the base station 600. The acquisition unit 602 acquires the estimation result on the degree of the degradation of the service quality, which is caused in the case that the power-save control is carried out to another base station 700 representing one or a plurality of other base stations, from another base station 700. The selection unit 603 selects the candidate base station, to which the power-save control should be carried out, out of the base station 600 and another base station 700 on the basis of the degree of the degradation of the service quality of the base station 600 and another base station 700.

Here, another base station 700 includes, at least, a configuration corresponding to the estimation unit 601 of the base station 600 and a configuration of sending the estimation result on the degree of the degradation of the service quality of another base station 700 to the base station 600.

According to the seventh exemplary embodiment mentioned above, the base station, whose degree of the degradation of the service quality after the power-save control is low, is selected as the candidate base station to which the power-save control should be carried out. Accordingly, it is possible to reduce power consumption of the base station with restraining emergence of the area whose service quality is degraded.

Here, it is possible to realize actually the first to the seventh exemplary embodiments by use of predetermined hardware such as a circuit.

Moreover, it is possible that the first to the seventh exemplary embodiments mentioned above are operated by control of a computer circuit (for example, CPU (Central Processing Unit)), which is not shown in the figure, on the basis of a control program. In the case, the control program is stored by a storage medium of the power-save operation supporting apparatus (or network monitoring apparatus), a storage medium of the base station, or an external storage medium. The control program is read and executed by the above-mentioned computer circuit. As the internal storage medium, ROM (Read Only Memory), a hard disk or the like is exemplified. As the external storage medium, a removable storage medium and a removable disk or the like is exemplified.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The application is based upon and claims the benefit of priority from Japanese Patent Application No. 2010-000148, filed on Jan. 4, 2010, the disclosure of which is incorporated herein in its entirety by reference.

REFERENCE SIGNS LIST

100 Network monitoring apparatus
101, 402 and 501 Power-save operation supporting apparatus
102 Mobile communication core network
103 Wireless access network
104 External network
110 to 112 Wired link
120 to 122 Base station
130 Mobile station
200 Candidate base station selecting unit
201 Service quality estimating unit
202 Traffic information storing unit
203 Service quality information storing unit
204 Base station information storing unit
300 Traffic information
301 Base station ID
302 Wireless cell ID
303 Number of calls
304 Traffic intensity
305 Number of mobile stations
310 Service quality information
311 Evaluation point
312 Received electric field intensity
313 Signal to interference ratio
314 Average throughput
315 Number of handover trials
316 Number of successful handover trials
317 Evaluation point quality information
318 Cell quality information
320 Base station information
321 Base station location
322 Wireless cell cover area
323 Wireless cell cover area after control 324 Antenna parameter
325 Power consumption
400 Weighting assigning unit
401 Map information storing unit
410 Weighting information
411 Evaluation point
412 Land attribute
413 Building attribute
414 Weighting
415 Map information
416 Weighting assigning information
500 Power-save effect calculating unit
600 Base station
601 Estimation unit
602 Acquisition unit
603 Selection unit
700 Another base station

The invention claimed is:

1. A power-save operation supporting apparatus, comprising:
a memory device that stores a set of instructions; and
at least one processor configured to execute the set of instructions to:
estimate a first value representing a degree of degradation of service quality over an area covered by one or more first base stations, the degradation being caused if a power-save control operation is applied to at least one of the one or more first base stations, wherein the estimation of the first value is not based on a presence of a mobile station in the area;
estimate a second value representing a reduced amount of power consumption by the one or more first base stations, the reduction of power consumption being caused by applying the power-save control operation to at least one of the one or more first base stations; and
select, based on the first value and the second value, the at least one of the one or more first base stations as a candidate base station to apply the power-save control operation.

2. The power-save operation supporting apparatus according to claim 1, wherein the power-save control operation includes control for stopping a transmitter for wireless communications.

3. The power-save operation supporting apparatus according to claim 1, wherein the at least one processor is further configured to execute the set of instructions to remove at least one of the one or more first base stations, for which a volume of traffic is not less than a predetermined reference, from the candidate base station to apply the power-save control operation.

4. The power-save operation supporting apparatus according to claim 1, wherein the degree of the degradation of the service quality is a spatial size of a degradation area whose service quality is degraded.

5. The power-save operation supporting apparatus according to claim 1, wherein the at least one processor is further configured to execute the set of instructions to:
select a candidate base station being associated with the lowest first value, among a plurality of the candidate base stations, to apply the power-save control operation.

6. The power-save operation supporting apparatus according to claim 1, wherein the at least one processor is further configured to execute the set of instructions to estimate a third value representing a reduced amount of power consumption by the one or more first base stations and a third base station, wherein the reduction of power consumption is caused by applying the power-save control operation to at least one of the one or more first base stations and the third base station, and wherein the estimation of the third value is based on:
(i) the second value;
(ii) an estimation of change in power consumption by the third base station, the change in power consumption being caused by applying the power-save control operation to the third base station; and
(iii) an estimation of change in a volume of traffic, the change in the volume of traffic being caused by applying the power-save control operation to the third base station.

7. The power-save operation supporting apparatus according to claim 1, wherein the service quality is estimated based on at least one of: received electric field intensity, signal to interference ratio, and throughput.

8. A power-save operation supporting apparatus, comprising:
a memory device that stores a set of instructions; and
at least one processor configured to execute the set of instructions to:
estimate one or more first values, each of the one or more first values representing a degree of degradation of service quality at a location within an area covered by one or more first base stations, the degradation being caused if a power-save control operation is applied to at least one of the one or more first base stations, wherein the estimation of the one or more first values is not based on a presence of a mobile station in the area;
associate one or more predetermined weighting factors to the one or more first values;
estimate a second value representing a degree of degradation of service quality over the area based on the one or more first values and the one or more predetermined weighting factors; and
select, based on the second value, the at least one of the one or more first base stations as a candidate base station to apply the power-save control operation.

9. A power-save operation supporting apparatus, comprising:
a memory device that stores a set of instructions; and
at least one processor configured to execute the set of instructions to:
estimate a first value representing a degree of degradation of service quality over an area covered by one or more first base stations, the degradation being caused if a power-save control operation is applied to at least one of the one or more first base stations, wherein the estimation of the first value is not based on a presence of a mobile station in the area;
detect a location, whose service quality is not higher than a predetermined threshold level, within an evaluation area;
judge whether at least one of one or more second base stations related to the location is selected;
calculate a physical distance from the location to each of the one or more first base stations in the case that the at least one of the one or more second base stations is not selected;
select a predetermined number of the one or more first base stations as the one or more second base stations in the order of ascending physical distance;
change wireless parameters of the selected one or more second base stations; and select, based on the first value, the at least one of the one or more first base stations as a candidate base station to apply the power-save control operation.

10. A power-save operation supporting apparatus, comprising:
a memory device that stores a set of instructions; and
at least one processor configured to execute the set of instructions to:
estimate a first value representing a degree of degradation of service quality over an area covered by one or more first base stations, the degradation being caused if a power-save control operation is applied to at least one of the one or more first base stations, wherein the estimation of the first value is not based on a presence of a mobile station in the area;
detect a location, whose service quality is not higher than a predetermined threshold level, within an evaluation area;
judge whether at least one of the one or more second base stations related to the location is selected;
calculate a path loss from the location to each of the one or more first base stations in the case that the at least one of the one or more second base stations is not selected;
select one of the one or more first base stations whose path loss is not larger than a predetermined threshold level, as one of the one or more second base stations;
change wireless parameters of the selected one of the one or more second base stations; and
select, based on the first value, the at least one of the one or more first base stations as a candidate base station to apply the power-save control operation.

11. A power-save operation supporting method, comprising:
estimating a first value representing a degree of degradation of service quality over an area covered by a base station, the degradation being caused if a power-save control operation is applied to at least the base station, wherein the estimation of the value is not based on a presence of a mobile station in the area;
estimating a second value representing a reduced amount of power consumption by at least the base station, the reduction of power consumption being caused by applying the power-save control operation to at least the base station; and
selecting, based on the first and second values, the base station as a candidate base station to apply the power-save control operation.

12. A non-transitory computer-readable medium storing instructions that, when executed by an apparatus, cause the apparatus to perform a method, the method comprising:
estimating a first value representing a degree of degradation of service quality over an area covered by a base station, the degradation being caused if a power-save control is applied to at least the base station, wherein the estimation of the value is not based on a presence of a mobile station in the area;
estimating a second value representing a reduced amount of power consumption by at least the base station, the reduction of power consumption being caused by applying the power-save control operation to at least the base station; and
selecting, based on the first and second values, the base station as a candidate base station to apply the power-save control operation.

13. A first base station which is at least one base station out a plurality of base stations to which power-save control can be carried out, comprising:
a memory device that stores a set of instructions; and
at least one processor configured to execute the set of instructions to:
estimate a first value representing a degree of degradation of service quality over a first area covered by the first base station, the degradation being caused if a power-save control operation is applied to at least the first base station, wherein the estimation of the first value is not based on a presence of a mobile station in the area;
acquire, from a second base station out of the plurality of base stations, a second value representing an estimation of a degree of degradation of service quality over a second area covered by the second base station, the degradation being caused if a power-save control operation is applied to at least the second base station;
estimate a third value representing a reduced amount of power consumption by at least one of the first and second base stations, the reduction of power consumption being caused by applying the power-save control operation to at least one of the first and second base stations; and
select, based on the first, second, and third values, a candidate base station, out of the first and second base stations, to apply the power-save control operation.

14. A power-save operation supporting apparatus, comprising:
a memory device that stores a set of instructions; and
at least one processor configured to execute the set of instructions to:
estimate a first value representing a degree of degradation of service quality over an area covered by one or more first base stations, the degradation being caused when a power-save control operation is applied to at least one of the one or more first base stations, wherein the estimation of the first value is based on an estimation of a first parameter indicative of a signal strength related to the service quality at a location with the area, and an estimation of a second parameter indicative of a distance between the location and the one or more first base stations;
estimate a second value representing a reduced amount of power consumption by the one or more first base stations, the reduction of power consumption being caused by applying the power-save control operation to at least one of the one or more first base stations; and
select, based on the first and second values, the at least one of the one or more first base stations as a candidate base station to apply the power-save control operation.

15. The power-save operation supporting apparatus according to claim 14, wherein the first parameter includes a value that reflects signal-to-interference ratio.

16. The power-save operation supporting apparatus according to claim 14, wherein the second parameter includes a value that reflects path loss.

* * * * *